(12) United States Patent
Abe et al.

(10) Patent No.: US 10,908,579 B2
(45) Date of Patent: Feb. 2, 2021

(54) CONTROLLER, CONTROL PROGRAM, AND CONTROL SYSTEM

(71) Applicant: OMRON Corporation, Kyoto (JP)

(72) Inventors: Yasuaki Abe, Ibaraki (JP); Yuhki Ueyama, Kyoto (JP); Nobuyuki Sakatani, Otsu (JP)

(73) Assignee: OMRON CORPORATION, Kyoto (JP)

( * ) Notice: Subject to any disclaimer, the term of this patent is extended or adjusted under 35 U.S.C. 154(b) by 240 days.

(21) Appl. No.: 15/901,925

(22) Filed: Feb. 22, 2018

(65) Prior Publication Data

US 2018/0284710 A1 Oct. 4, 2018

(30) Foreign Application Priority Data

Mar. 31, 2017 (JP) .................. 2017-069932

(51) Int. Cl.
G05B 19/048 (2006.01)
G06F 16/21 (2019.01)
G05B 19/05 (2006.01)

(52) U.S. Cl.
CPC ......... *G05B 19/048* (2013.01); *G05B 19/054* (2013.01); *G06F 16/217* (2019.01); *G05B 2219/13063* (2013.01); *G05B 2219/2241* (2013.01); *G05B 2219/25213* (2013.01)

(58) Field of Classification Search
CPC ........................... G08C 17/02; G08C 2201/50; G08C 2201/92; G08C 17/00; G08C 19/28; G08C 2201/21; G08C 23/04; G08C 15/08; G08C 15/12; G05B 19/048; G05B 19/054;
(Continued)

(56) References Cited

U.S. PATENT DOCUMENTS 5,479,756 A * 1/1996 Haze ................. B65B 57/00
340/3.2
6,529,785 B1 3/2003 Keeley
(Continued)

FOREIGN PATENT DOCUMENTS

CN 1188359 A 7/1998
CN 1396502 A 2/2003
(Continued)

OTHER PUBLICATIONS

Extended European search report dated Aug. 23, 2018 in the counterpart European patent application.
(Continued)

*Primary Examiner* — Nabil H Syed
(74) *Attorney, Agent, or Firm* — Metrolex IP Law Group, PLLC

(57) ABSTRACT

A controller performs a control operation associated with a control target. The controller includes a communication interface that electrically connects at least one function unit to the controller through a data transmission path, a writing unit that writes an observation value obtained through the function unit into a database, and a delay obtaining unit that obtains a delay time taken from when a signal indicating an observation value is input into the function unit to when data representing the observation value becomes usable in the controller, and stores information indicating the obtained delay time.

14 Claims, 15 Drawing Sheets

(58) Field of Classification Search
CPC .. G05B 2219/13063; G05B 2219/2241; G05B 2219/25213; G06F 16/217
USPC ............................................................ 340/3.2
See application file for complete search history.

(56) References Cited

U.S. PATENT DOCUMENTS

| | | | |
|---|---|---|---|
| 7,593,351 B1* | 9/2009 | Zioulas | H04L 43/00 340/3.2 |
| 8,224,521 B2* | 7/2012 | Taniguchi | H04L 67/125 340/3.2 |
| 10,284,692 B2* | 5/2019 | Ichimura | G05B 19/4185 |
| 2003/0007414 A1 | 1/2003 | Kato | |
| 2005/0089067 A1 | 4/2005 | Kinoshita et al. | |
| 2006/0239285 A1 | 10/2006 | Nomura et al. | |
| 2007/0047588 A1 | 3/2007 | Koga et al. | |
| 2009/0105850 A1* | 4/2009 | Miyata | G05B 19/042 700/28 |
| 2011/0252265 A1 | 10/2011 | Iwami et al. | |
| 2012/0330452 A1* | 12/2012 | Guenther | G05B 19/058 700/110 |
| 2014/0089717 A1 | 3/2014 | Alsup | |
| 2015/0362912 A1 | 12/2015 | Yoshida et al. | |
| 2016/0054718 A1* | 2/2016 | Nakagawa | G05B 19/4183 340/3.3 |
| 2016/0292110 A1 | 10/2016 | Niwa et al. | |
| 2019/0229885 A1* | 7/2019 | Fukuda | H04L 12/28 |

FOREIGN PATENT DOCUMENTS

| | | |
|---|---|---|
| CN | 1612508 A | 5/2005 |
| CN | 1893325 A | 1/2007 |
| CN | 1925445 A | 3/2007 |
| CN | 102215319 A | 10/2011 |
| CN | 105209988 A | 12/2015 |
| CN | 105320072 A | 2/2016 |
| CN | 106020094 A | 10/2016 |
| EP | 2538290 A2 | 12/2012 |
| EP | 3026515 A1 | 6/2016 |
| EP | 3076251 A1 | 10/2016 |
| JP | 2008-293138 A | 12/2008 |
| JP | 2009-059182 A | 3/2009 |
| JP | 2011-191874 A | 9/2011 |
| JP | 2015-201194 A | 11/2015 |
| JP | 2016-192172 A | 11/2016 |
| WO | 2015/114821 A1 | 8/2015 |
| WO | 2015/128981 A1 | 9/2015 |

OTHER PUBLICATIONS

Japanese Office Action (JPOA) dated Apr. 17, 2018 in the counterpart Japanese patent application.
Office Action (CNOA) dated Sep. 21, 2020 in a counterpart Chinese patent application.

* cited by examiner

CPU sensor variable
(DB input)

Delay time to
be corrected

Coupler unit output

Constant
period
communication
delay

Function unit output

Function-unit-
caused delay
(e.g., filter)

Sensor output

△ Workpiece starts passing

Time

FIG. 14A
CPU sensor variable (DB input)
FIG. 14B
Function unit output (oversampling output)
FIG. 14C
Sampling period
FIG. 14D
Sensor output
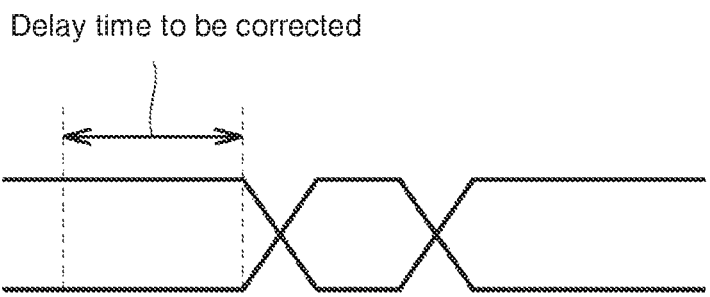
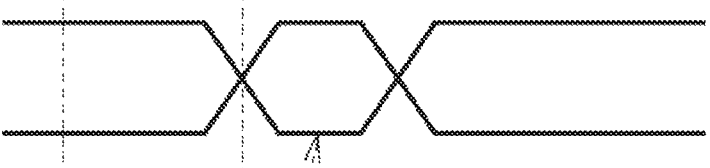
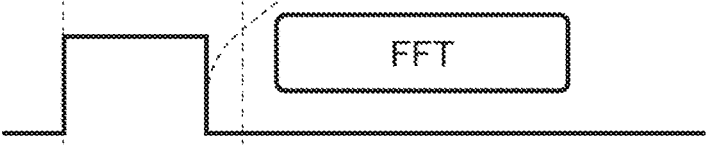
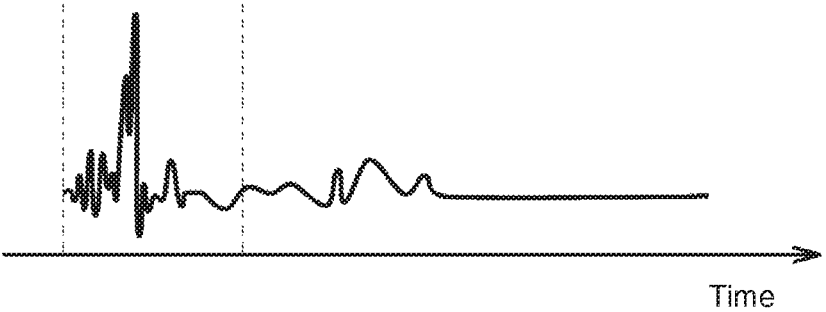
Delay time to be corrected
FFT
Time

CONTROLLER, CONTROL PROGRAM, AND CONTROL SYSTEM

CROSS REFERENCE TO RELATED APPLICATIONS

This application claims priority from prior Japanese Patent Application No. 2017-069932 filed with the Japan Patent Office on Mar. 31, 2017, the entire contents of which are incorporated herein by reference.

FIELD

The disclosure relates to a controller that can use a database, a control program executed in the controller, and a control system including the controller.

BACKGROUND

Factory automation (FA) technology involving controllers, such as programmable logic controllers (PLCs), has been widely used at various production sites. A demand is increasing for using data processed by such controllers.

For example, Japanese Unexamined Patent Application Publication No. 2008-293138 (Patent Literature 1) describes condition monitoring in debugging for checking the program logic by holding a value obtained when a particular condition is satisfied.

The progress in information and communication technology (ICT) now enables controllers to collect and store a large amount of data, instead of holding a value obtained when a particular condition is satisfied as described in Patent Literature 1.

CITATION LIST

Patent Literature

Patent Literature 1: Japanese Unexamined Patent Application Publication No. 2008-293138

SUMMARY

Technical Problem

A relatively large controller is connected to a function unit with a data transmission path, which is referred to as a fieldbus or a field network. The function unit collects observation values from a sensor mounted on a control target.

The multiple observation values are to be collected from the control target on the same time axis. More specifically, the observation values are to be collected for comparison between observation values occurring at the same time. Typically, the controller is connected to different function units in different modes. With the controller and the function units connected in different connection modes, the function units may have delay times that differ between an observation value actually appearing in a control target and an observation value being obtained by the controller. Additionally, such delay times may prevent accurate determination of the time at which an observation value has actually appeared.

One or more aspects are directed to a mechanism for accurately determining the time at which an observation value obtained from a control target has actually appeared.

Solution to Problem

An aspect provides a controller that performs a control operation associated with a control target. The controller includes a communication interface that electrically connects at least one function unit to the controller through a data transmission path, a writing unit that writes an observation value obtained through the function unit into a database, and a delay obtaining unit that obtains a delay time taken from when a signal indicating an observation value is input into the function unit to when data representing the observation value becomes usable in the controller, and stores information indicating the obtained delay time.

In an aspect, the time from when a signal indicating the observation value is input into the function unit to when data representing the observation value becomes usable in the controller involves a delay time, and an observation value associated with a time having this delay may be written into the database. In this case, the obtained and stored information indicating the delay enables subsequent analysis or other processing with high accuracy.

In one or more embodiments, the controller further includes a time determination unit that determines a time at which the signal indicating the observation value has appeared based on the information indicating the delay time obtained by the delay obtaining unit. An aspect allows accurate determination of the time at which the observation value obtained from the control target has actually appeared.

In one or more embodiments, the writing unit associates the observation value with the time at which the observation value becomes usable in the controller, and writes the observation value and the time into the database, and the time determination unit corrects the time associated with an observation value read from the database based on the information indicating the delay time obtained by the delay obtaining unit to determine the time at which the signal indicating the observation value has appeared. An aspect allows output of the results including the accurate time at which the observation value obtained from the control target has actually appeared.

In one or more embodiments, the delay time includes a first delay time that does not vary over time and a second delay time that varies over time. An aspect allows the delay time to be obtained based on a non-time-varying component and a time-varying component.

In one or more embodiments, the first delay time includes a delay time that depends on at least one of a processing characteristic defined in the function unit and a function of the function unit. An aspect allows the length of the delay time to be determined based on the processing characteristic defined in the function unit or the function of the function unit.

In one or more embodiments, the first delay time includes a delay time that depends on the data transmission path from the function unit to the controller. An aspect allows the length of the delay time to be determined based on the data transmission path from the function unit to the controller.

In one or more embodiments, the communication interface includes a counter and the function unit includes a counter, and the counters are time-synchronized with each other. The second delay time includes a delay time that varies over time depending on a difference between counter values indicated by the counters that are time-synchronized with each other. An aspect allows the length of the delay time to be dynamically determined based on factors such as a time difference between the time-synchronized counters.

In one or more embodiments, the controller further includes an output unit that outputs an observation value stored in the database and information indicating a delay time associated with the observation value. An aspect allows accurate determination of the time at which the observation value has actually appeared when a device other than the controller analyzes the observation value.

In one or more embodiments, the database is embedded in the controller. An aspect allows faster data writing into the database from the controller.

Another aspect provides a control program that is executed by a controller for performing a control operation associated with a control target. The controller is electrically connected to at least one function unit through a data transmission path. The control program causes the controller to implement writing an observation value obtained through the function unit into a database, and obtaining a delay time taken from when a signal indicating an observation value is input into the function unit to when data representing the observation value becomes usable in the controller, and storing information indicating the obtained delay time.

In another aspect, the time from when a signal indicating the observation value is input into the function unit to when data representing the observation value becomes usable in the controller involves a delay time, and an observation value associated with a time having this delay time may be written into the database. In this case, the obtained and stored information indicating the delay time enables subsequent analysis or other processing with high accuracy.

A control system according to another aspect includes a controller that performs a control operation associated with a control target, and at least one function unit electrically connected to the controller through a data transmission path. The controller includes a writing unit that writes an observation value obtained through the function unit into a database, and a delay obtaining unit that obtains a delay time taken from when a signal indicating an observation value is input into the function unit to when data representing the observation value becomes usable in the controller, and stores information indicating the obtained delay time.

In another aspect, the time from when a signal indicating the observation value is input into the function unit to when data representing the observation value becomes usable in the controller involves a delay time, and an observation value associated with a time having this delay time may be written into the database. In this case, the obtained and stored information indicating the delay time enables subsequent analysis or other processing with high accuracy.

Advantageous Effects

The mechanism according to one or more aspects accurately determine the time at which an observation value obtained from a control target has actually appeared.

BRIEF DESCRIPTION OF THE DRAWINGS

FIGS. 14A to 14D are time charts illustrating input processing with oversampling performed by a function unit in a control system according to one or more embodiments.

DETAILED DESCRIPTION

Figure 1:
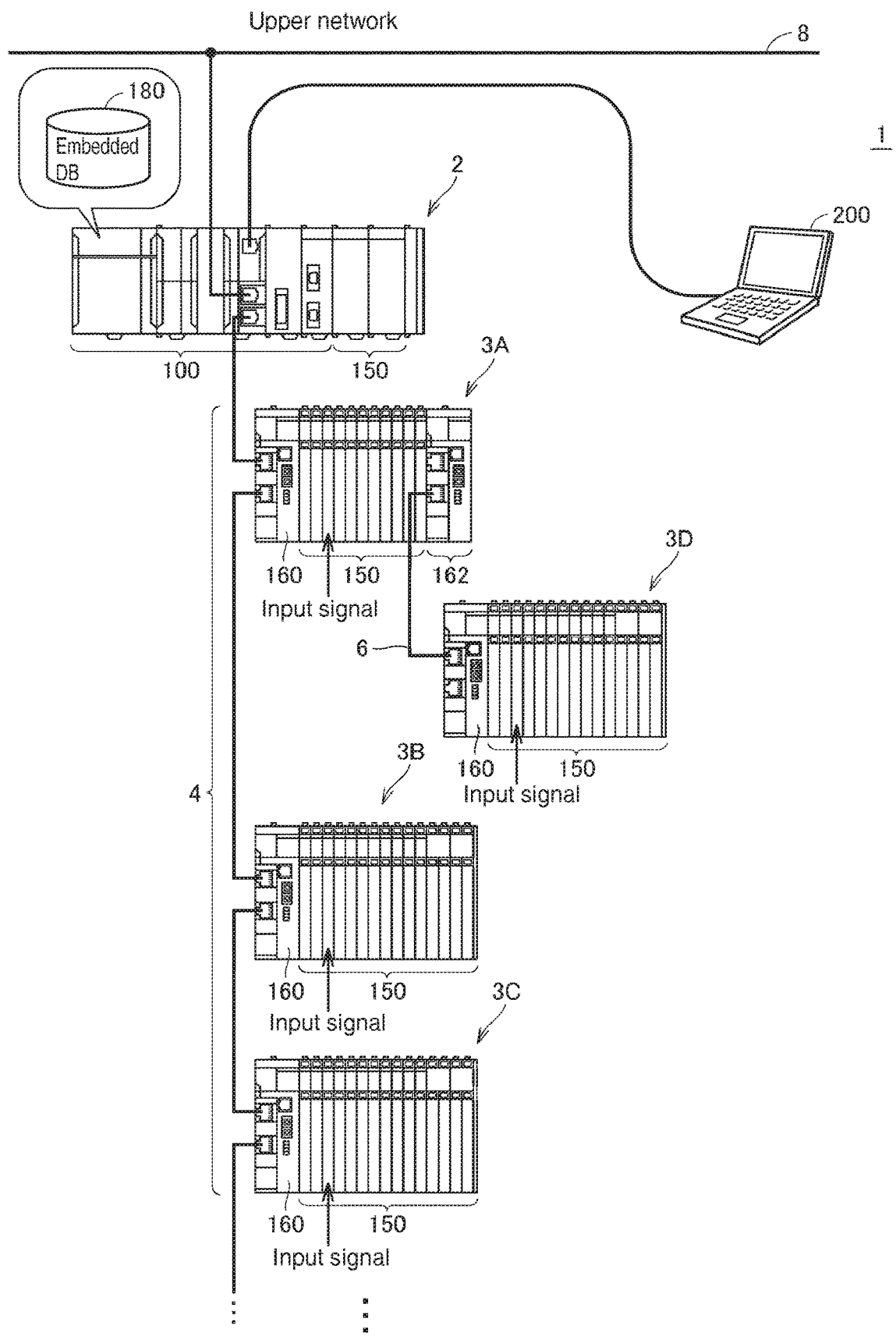
FIG. 1 is a schematic diagram illustrating the configuration of a control system according to one or more embodiments.

One or more embodiments will now be described with reference to the drawings. The same or corresponding components in the figures are given the same reference numerals, and will not be described repeatedly.

A. Overall Configuration of Control System

The overall configuration of a control system 1 according to one or more embodiments will now be described. FIG. 1 is a schematic diagram showing the configuration of the control system 1 according to one or more embodiments.

Referring to FIG. 1, for example, the control system 1 includes a programmable controller (PLC) 2 for controlling a control target, and remote IO devices 3A, 3B, 3C, and 3D (also collectively referred to as remote IO devices 3) connected to the PLC 2 with a fieldbus.

A common fieldbus may also be referred to as a field network. For simplicity, a fieldbus and a field network will be hereafter collectively referred to as a fieldbus. More specifically, a fieldbus herein may include a field network as well as a fieldbus.

The PLC 2 may also be connected to an upper network 8. The upper network 8 may be connected to another PLC or any information processing apparatuses such as a gateway and a database server.

In the configuration shown in FIG. 1, the remote IO devices 3A, 3B, and 3C are connected to the PLC 2 with the fieldbus 4. The remote IO device 3A has another fieldbus 6 with which the remote IO device 3A is connected to the remote IO device 3D. The fieldbus 6 is managed by a coupler unit 160 mounted on the remote IO device 3A. The PLC 2 has access to the remote IO device 3D through the fieldbuses 4 and 6.

The fieldbuses 4 and 6 typically use a protocol that enables an on-time arrival of data transmitted from one network node to another. The protocol may be, for example, EtherCAT (registered trademark), or may be EtherNet/IP (registered trademark), DeviceNet (registered trademark), or CompoNet (registered trademark). The fieldbuses 4 and 6 may not use the same protocol but may use protocols appropriate for individual devices and units.

The PLC 2 typically includes a central processing unit (CPU) 100, and one or more function units 150 mounted on the CPU 100. The CPU 100 serves as a controller that performs a control operation for a control target. The CPU 100 may be solely referred to as a controller, or the CPU 100 and the function units 150 may be together referred to as a controller.

The remote IO devices 3 each include a coupler unit 160 with a communication function, and one or more function units 150 mounted on the coupler unit 160. The CPU 100 and the function units 150 are electrically connected by a data transmission path referred to as a local bus. The coupler unit 160 and the function units 150 are also electrically connected by the data transmission path.

The function unit used herein includes a device for transmitting and receiving various signals to and from control targets such as equipment and machinery. Each of the function units 150 has, for example, one or more of a digital input (DI) function of receiving a digital signal from a control target, a digital output (DO) function of transmitting a digital signal to a control target, an analog input (AI) function of receiving an analog signal from a control target, and an analog output (AO) function of transmitting an analog signal to a control target. The function unit 150 may also have special functions such as proportional-integral-derivative (PID) control and motion control.

As described above, the CPU 100 and the function units 150 are electrically connected by the data transmission path, which is a fieldbus and/or a local bus.

In one or more embodiments, the CPU 100, which is an example of a controller, includes a database for storing observation values collected through the function units 150. The database is incorporated in the CPU 100, and will thus be referred to as an embedded database 180. In one or more embodiments, the database is embedded in the CPU 100 in one example. However, one or more embodiments are not directed to the database. The database may be included in a device other than the CPU 100 (in other words, an external database). The embedded database may also be combined with an external database. The database may be simply referred to as the DB.

The observation value used herein collectively refers to values (actual values) usable in the CPU 100 for a control operation. Typical examples of observation values include an input value (digital or analog value) obtained from a control target for use in a control operation, an output value or a command value (digital or analog value) to a control target, determined by a control operation based on an obtained input value, and a value calculated in the control operation process (digital or analog value). In other words, the observation values include any values to be stored into the CPU 100 as data or output from the CPU 100 as data.

Typically, one or more observation values are stored as a record in the embedded database 180.

B. Hardware Configurations of Devices

The hardware configurations of the devices included in the control system 1 according to one or more embodiments will now be described.

b1: PLC

Figure 2:
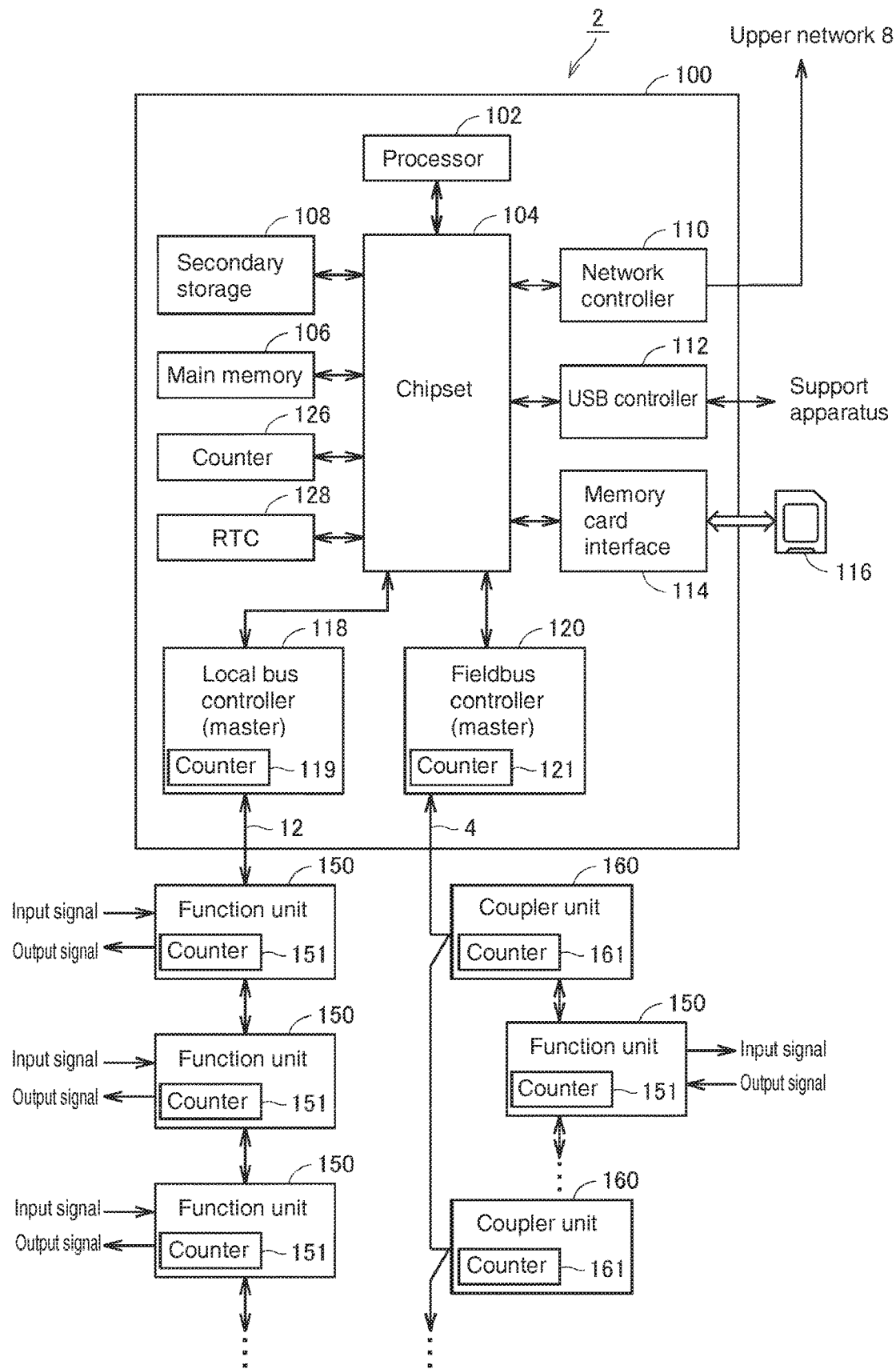
FIG. 2 is a block diagram illustrating the hardware configuration of a PLC included in a control system according to one or more embodiments.

FIG. 2 is a block diagram showing the hardware configuration of the PLC 2 included in the control system 1 according to one or more embodiments. Referring to FIG. 2, the PLC 2 includes the CPU 100 and one or more function units 150.

The CPU 100 includes a processor 102, a chipset 104, a main memory 106, a secondary storage 108, a network controller 110, a universal serial bus (USB) controller 112, a memory card interface 114, a local bus controller 118, a fieldbus controller 120, a counter 126, and a real time clock (RTC) 128.

The processor 102 serves as a computation processing unit for executing operations such as a control operation. The processor 102 includes a CPU, a micro-processing unit (MPU), or a graphics processing unit (GPU). More specifically, the processor 102 reads various programs stored in the secondary storage 108 and expands the programs in the main memory 106 and executes the programs to appropriately control a control target and perform various processes described later. The secondary storage 108 is, for example, a nonvolatile storage, such as a hard disk drive (HDD) or a solid state drive (SSD). The main memory 106 is, for example, a volatile memory, such as a dynamic random access memory (DRAM) or a static random access memory (SRAM).

The chipset 104 controls the processor 102 and each unit to enable the overall processing of the CPU 100.

The secondary storage 108 stores system programs for implementing basic operations and user programs created in accordance with control targets, such as equipment and machinery. The secondary storage 108 may also have the embedded database 180 (refer to FIG. 1). The embedded database 180 is typically implemented by the processor 102 in the CPU 100 reading a system program stored in the secondary storage 108, and expanding the program in the main memory 106 and executing the program.

The network controller 110 transmits and receives data to and from any information processing apparatuses such as a gateway and a database server through the upper network 8. The USB controller 112 transmits and receives data to and from a support apparatus 200 with a universal serial bus (USB) connection.

The memory card interface 114 can receive a removable memory card 116, to which data can be written, and from which various items of data (e.g., a user program and trace data) can be read. The memory card 116 may also have the embedded database 180 (refer to FIG. 1).

The counter 126 is used as a time reference for managing a timing at which the CPU 100 executes each program. The counter 126 typically increments or decrements its counter value in every predetermined cycle. The counter 126 may be implemented using, for example, a high precision event timer (HPET) located on a system bus for driving the processor 102, or using a dedicated circuit, such as an application-specific integrated circuit (ASIC) or a field-programmable gate array (FPGA).

The RTC 128 is a counter that functions as a clock, and provides the current time to the processor 102 and other devices.

The local bus controller 118 serves as a communication interface for electrically connecting the function unit(s) 150 to the CPU 100 through a data transmission path. More specifically, the local bus controller 118 transmits and receives data to and from the function unit(s) 150 mounted on the CPU 100 through a local bus 12. The local bus controller 118 includes a counter 119 used as a time reference for timing management between the local bus controller 118 and the function units 150 connected to it through the local bus 12. Similarly, each of the function units 150 also includes a counter 151 used as a time reference for timing management between one of the function units 150 and the local bus controller 118 as well as between one of the function units 150 and the other function units 150. The counters 119 and 151 may have the same structure as the counter 126 described above.

The local bus controller 118 functions as a communication master for constant cycle communication through the local bus 12. The local bus controller 118 successively monitors the difference between the counter values indicated by the counter 119 and the counter included in each function unit 150 (corresponding to a communication slave) connected to the local bus 12. The local bus controller 118 outputs, as appropriate, a time synchronization signal to a device holding a deviated counter value to instruct this device to correct the deviation.

In this manner, the counter in the local bus controller 118 corresponding to the communication interface is time-synchronized with the counter in each function unit 150. The local bus controller 118 has a synchronization management function of instructing a function unit 150 to synchronize the counter value indicated by its counter with the counter value indicated by the counter 119.

The fieldbus controller 120 serves as a communication interface for electrically connecting the function unit(s) 150 to the CPU 100 through a data transmission path. More specifically, the fieldbus controller 120 transmits and receives data to and from devices such as the coupler units 160 and the function units 150 connected to the coupler units 160 with the fieldbus 4. The fieldbus controller 120 includes a counter 121 used as a time reference for timing management between the fieldbus controller 120 and the devices (e.g., the coupler units 160) connected to it with the fieldbus 4. Similarly, each of the devices (e.g., the coupler units 160 and the function units 150 connected to the coupler units 160) also includes a counter 161 or the counter 151 used as a time reference for timing management between the fieldbus controller 120 and the coupler unit 160 or the function unit 150. The counter 121, the counter 161, and the counter 151 maintain time synchronization between them. The counter 121, the counter, 161 and the counter 151 may have the same structure as the counter 126 described above.

The fieldbus controller 120 functions as a communication master for constant cycle communication through the fieldbus 4. The fieldbus controller 120 sequentially monitors the difference between the counter values indicated by the counter 121 and the counter 161 included in each of the coupler units 160 (corresponding to communication slaves) connected to the fieldbus 4. The fieldbus controller 120 outputs, as appropriate, a time synchronization signal to a coupler unit 160 holding a deviated counter value. The time synchronization signal instructs the coupler unit 160 to correct the deviation. In this manner, the fieldbus controller 120 has a synchronization management function of instructing a coupler unit 160 to have the same counter value indicated by its counter 161 as the counter value indicated by the counter 121.

The counter 161 in each coupler unit 160 is managed to synchronize with the counter(s) 151 in the function unit(s) 150 mounted on the coupler unit 160. Thus, the counters in the fieldbus controller 120 corresponding to the communication interface, the coupler units 160, and the function units 150 are time-synchronized with each other.

Although FIG. 2 shows the configuration in which the processor 102 executes programs to provide intended functions, some or all of the provided functions may also be implemented using dedicated hardware circuits (e.g., ASICs or FPGAs). The main part of the CPU 100 may be implemented using hardware with a general-purpose architecture (e.g., an industrial computer based on a general-purpose computer). In that case, multiple operating systems (OSes) for different uses may run in parallel using a virtualization technique, and an intended application may be executed on each OS.

The CPU 100 may also function as a display or the support apparatus 200.

b2: Function Unit

Figure 3:
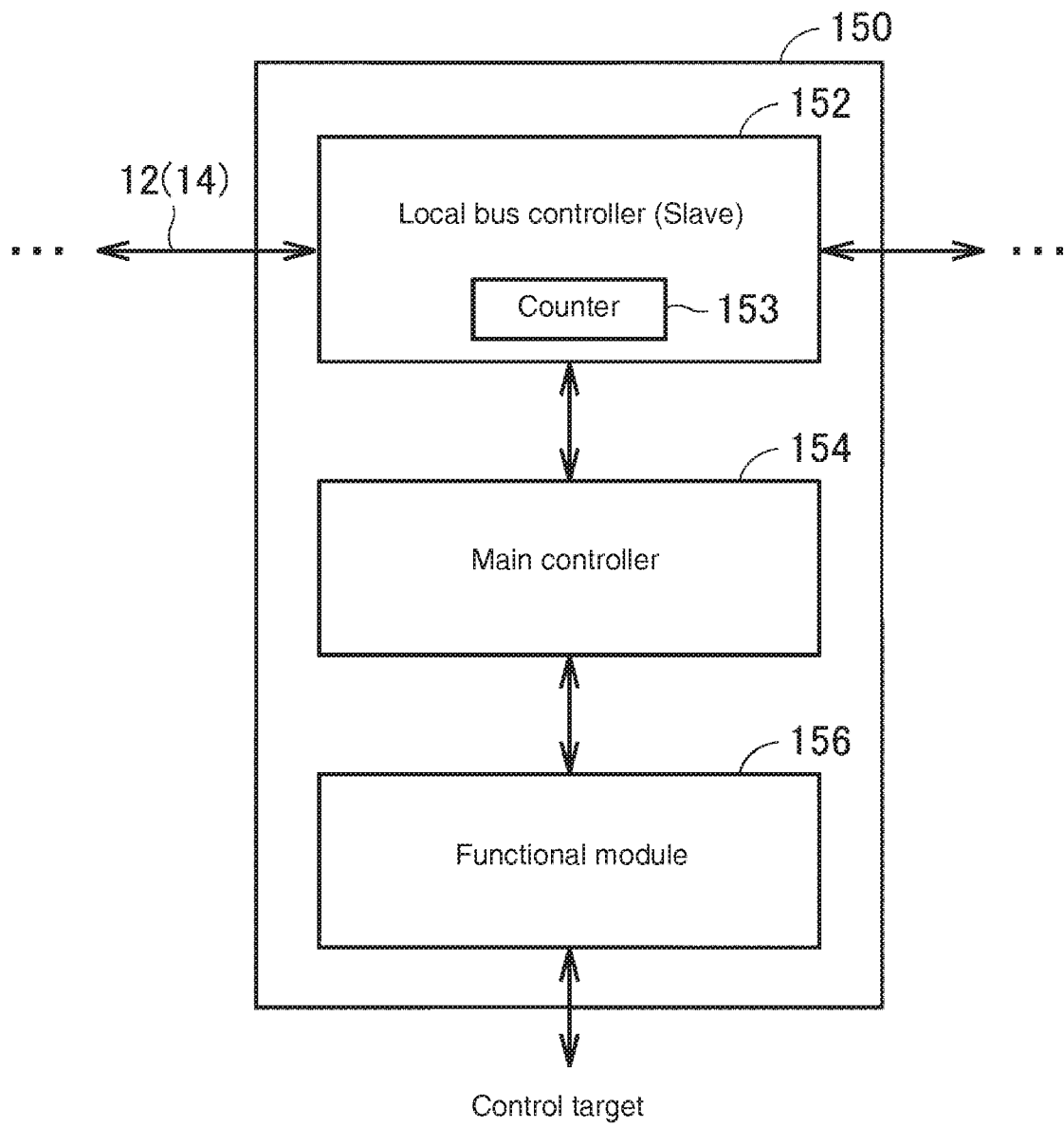
FIG. 3 is a block diagram illustrating the hardware configuration of a function unit included in a control system according to one or more embodiments.

FIG. 3 is a block diagram showing the hardware configuration of each function unit 150 included in the control system 1 according to one or more embodiments. Referring to FIG. 3, the function unit 150 includes a local bus controller 152, a main controller 154 corresponding to a computation processing unit, and a functional module 156.

The local bus controller 152 is typically implemented using a dedicated circuit such as an ASIC or an FPGA, and transmits and receives data to and from the CPU 100 through the local bus 12. With the function unit 150 mounted on the coupler unit 160, the local bus controller 152 transmits and receives data to and from the coupler unit 160 through a local bus 14 (refer to FIG. 4 described below).

The local bus controller 152 includes a counter 153 used as a time reference for timing management in data communication through the local bus 12. The local bus controller 152 functions as a communication slave that times data transmission or reception in response to an instruction from the communication master.

The main controller 154 serves as a computation processing unit for centrally controlling the processing for the function unit 150. The main controller 154 provides the functional module 156 with an instruction for measurement timing and other instructions, and transmits a measurement value from the functional module 156 through the local bus controller 152.

The main controller 154 is typically implemented using a dedicated circuit such as an ASIC or an FPGA, but may be implemented with software. In software implementations, the main controller 154 mainly includes a processor, a main memory, and a secondary storage. The processor reads system programs (firmware) stored in the secondary storage, and expands the programs in the main memory and executes the programs to implement intended processing.

The functional module 156 is the core for the functions in the function unit 150, and includes, for example, a logic circuit including diodes and transistors for implementing a DI function or a DO function. The functional module 156 may also include an analog-to-digital (AD) converter and a digital-to-analog (DA) converter for implementing an AI function or an AO function. The functional module 156 may further include a processor for implementing special functions such as PID control and motion control. The functional module 156 may have any structure in accordance with the function assigned to the function unit 150.

b3: Coupler Unit

Figure 4:
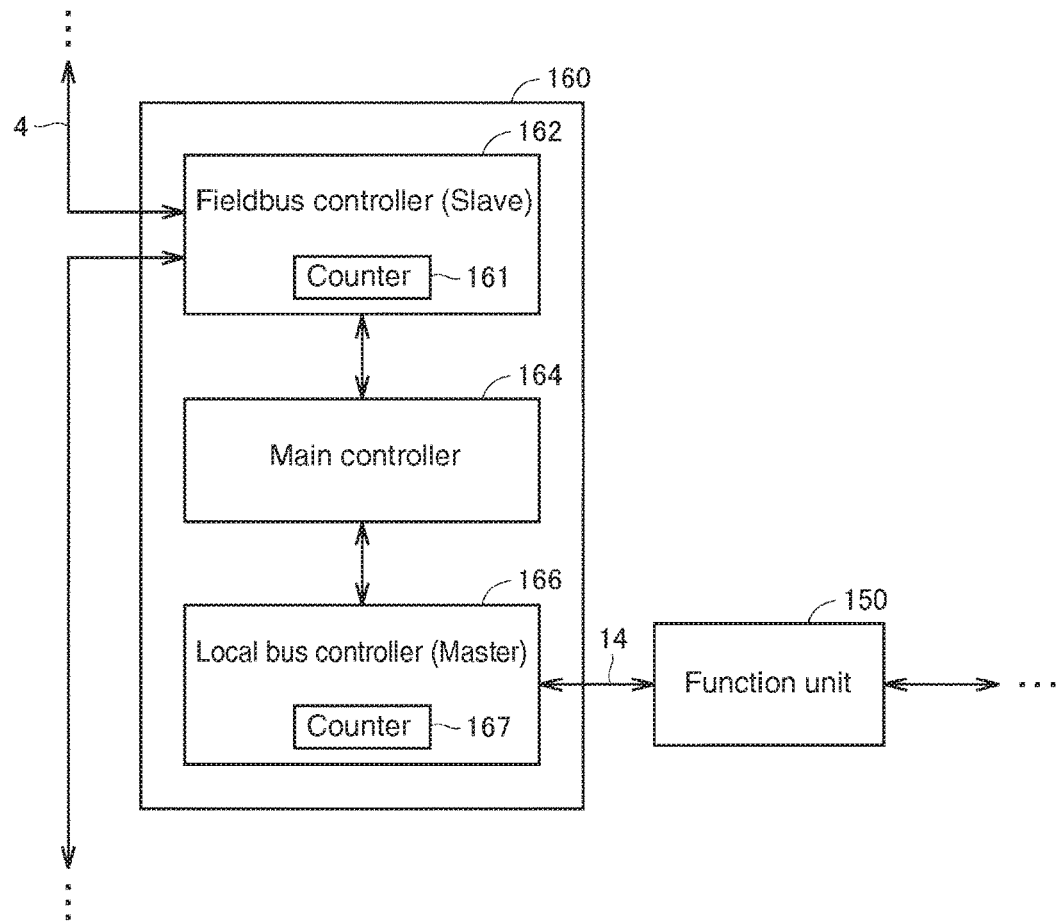
FIG. 4 is a block diagram illustrating the hardware configuration of a coupler unit included in a control system according to one or more embodiments.

FIG. 4 is a block diagram showing the hardware configuration of each coupler unit 160 included in the control system 1 according to one or more embodiments. Referring to FIG. 4, the coupler unit 160 has an interface for connecting to the fieldbus 4 as well as an interface for connecting to its local bus 14.

More specifically, the coupler unit 160 includes a fieldbus controller 162, a main controller 164, and a local bus controller 166.

The fieldbus controller 162 is typically implemented using a dedicated circuit such as an ASIC or an FPGA, and transmits and receives data to and from the CPU 100 through the fieldbus 4. The fieldbus controller 162 includes the counter 161 used as a time reference for timing management in data communication through the fieldbus 4. The fieldbus controller 162 functions as a communication slave that times data transmission or reception in response to an instruction from the communication master.

The main controller 164 serves as a computation processing unit for centrally controlling the processing for the coupler unit 160. The main controller 164 mainly controls the data communication between the fieldbus 4 and the local bus 14.

The main controller 164 is typically implemented using a dedicated circuit such as an ASIC or an FPGA, but may be implemented with software. In software implementations, the main controller 164 mainly includes a processor, a main memory, and a secondary storage. The processor reads system programs (firmware) stored in the secondary storage and expands the programs in the main memory and executes the programs to implement intended processing.

The local bus controller 166 transmits and receives data to and from the function unit(s) 150 through the local bus 14. The local bus controller 166 includes a counter 167 used as a time reference for timing management between the local bus controller 166 and the function unit 150 connected to it through the local bus 14. The local bus controller 166 functions as a communication master for constant cycle communication through the local bus 14. The local bus controller 166 sequentially monitors the difference between the counter values indicated by the counter 167 and the counter in each of the function units 150 (corresponding to communication slaves) connected to the local bus 14. The local bus controller 166 outputs, as appropriate, a time synchronization signal to a device holding a deviated counter value. The time synchronization signal instructs this device to correct the deviation. In this manner, the local bus controller 166 has a synchronization management function of instructing a function unit 150 to have the same counter value indicated by its counter as the counter value indicated by the counter 167.

b4: Support Apparatus

Figure 5:
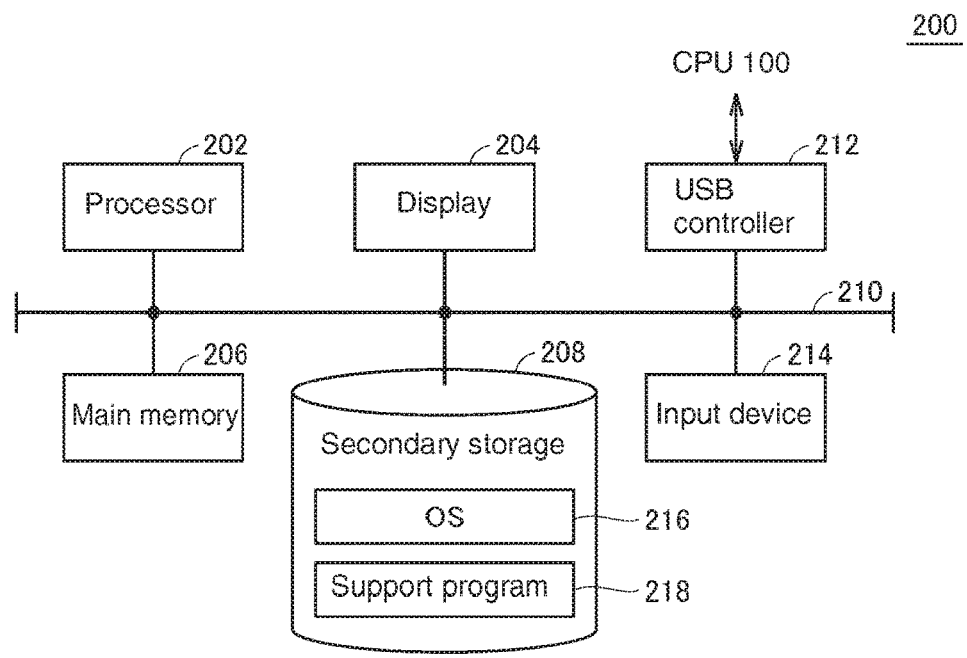
FIG. 5 is a block diagram illustrating the hardware configuration of a support apparatus included in a control system according to one or more embodiments.

FIG. 5 is a block diagram showing the hardware configuration of the support apparatus 200 included in the control system 1 according to one or more embodiments. The support apparatus 200 provides the functions of, for example, checking various variables and various set values managed by the coupler unit 160 in the CPU 100, developing and debugging a program executed in the CPU 100, and using data stored in the embedded database 180 in the CPU 100 (e.g., data mining).

The support apparatus 200 is typically implemented by executing a support program on a personal computer with a general-purpose architecture. More specifically, referring to FIG. 5, the support apparatus 200 includes a processor 202, a display 204, a main memory 206, a secondary storage 208, a USB controller 212, and an input device 214. These components are connected by an internal bus 210.

The processor 202 may be a CPU, an MPU, or a GPU. The processor 202 loads various programs including an OS 216 and a support program 218 stored in the secondary storage 208 into the main memory 206, and executes them to implement the various functions described above. The secondary storage 208 is, for example, a nonvolatile storage device such as an HDD or an SSD. The main memory 206 is a volatile storage device such as a DRAM or an SRAM.

The display 204 is a device on which operational results from the processor 202 appears, and is for example a liquid crystal display (LCD).

The USB controller 212 transmits and receives data to and from the CPU 100 with a USB connection.

The input device 214 receives a user operation, and includes, for example, a keyboard and a memory.

C. Processing Overview

An overview of the processing for the control system 1 according to one or more embodiments will now be provided.

Figure 6:
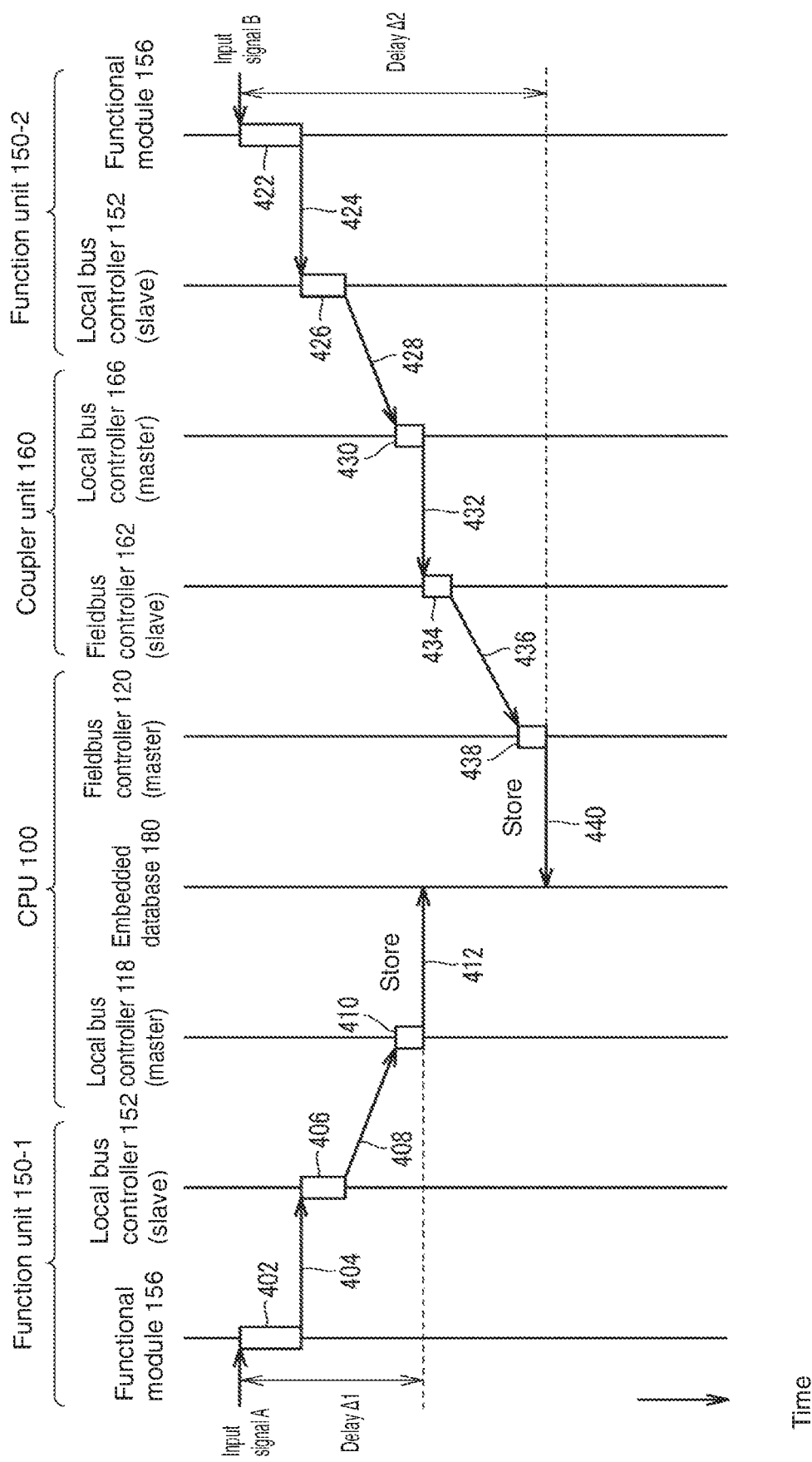
FIG. 6 is a time chart illustrating the time taken for data transmission in a control system according to one or more embodiments.

FIG. 6 is a time chart showing the time taken for data transmission in the control system 1 according to one or more embodiments. FIG. 6 shows transmission of data represented by input signals. One signal is input in a function unit 150-1 connected to the CPU 100 through a local bus, and the other signal is input in a function unit 150-2 connected to the CPU 100 through a fieldbus. In this example, the function unit 150-2 is connected to a coupler unit 160 through a local bus, and is included in a remote IO device 3.

Referring to FIG. 6, the input signal A is first input into the local-bus-connected function unit 150-1. The functional module 156 in the function unit 150-1 converts the input signal A into digital data through input processing 402 such as AD conversion, and subjects the resultant signal to the processing of transmission 404 to the local bus controller 152. The local bus controller 152 then performs transmission preprocessing 406 such as encoding, which is followed by the processing of transmission 408 to the local bus controller 118 in the CPU 100. The local bus controller 118 subjects the received data to reception processing 410 such as decoding, and then to the processing of storing 412 in the embedded database 180.

This data transmission process causes a delay Δ1 between the input of the input signal A into the function unit 150-1 and the completion of storing the data represented by the input signal A into the embedded database 180.

Also, the input signal B is input into the fieldbus-connected function unit 150-2. The functional module 156 in the function unit 150-2 converts the input signal B into digital data through input processing 422 such as AD conversion, and subjects the resultant signal to the processing of transmission 424 to the local bus controller 152. The local bus controller 166 then performs transmission preprocessing 426 such as encoding, which is followed by the processing of transmission 428 to the local bus controller 166 in the coupler unit 160. The local bus controller 166 subjects the received data to reception processing 430 such as decoding, and then to the processing of transmission 432 to the fieldbus controller 162.

The fieldbus controller 162 performs transmission preprocessing 434 such as encoding, which is followed by the processing of transmission 436 to the fieldbus controller 120 in the CPU 100. The fieldbus controller 120 subjects the received data to reception processing 438 such as decoding, and then to the processing of storing 440 in the embedded database 180.

This data transmission process causes a delay time Δ2 between the input of the input signal B into the function unit 150-2 and the completion of storing the data represented by the input signal B into the embedded database 180.

The input signal A is input into the function unit 150-1 and the input signal B is input into the function unit 150-2 at the same time on the time chart shown in FIG. 6. However, the data represented by the signal A and the data represented by the signal B are stored into the embedded database 180 in the CPU 100 at different times. More specifically, the time at which a phenomenon actually occurs in a control target does not match the time at which the corresponding data is actually stored into the embedded database 180 because of different delay times, or the delay time Δ1 and the delay time Δ2.

For subsequent use of such data stored in the embedded database 180, the time at which the phenomenon actually occurs is to be identified as accurately as possible. The CPU 100 according to one or more embodiments thus allows data management information for correcting such a delay time to be stored with collected observation values. The data management information is used to correct the time of the observation value. The correction enables identification of the time at which the corresponding phenomenon has actually occurred.

The delay time herein refers to the time taken from when the signal indicating an observation value is input into the function unit 150 to when the data representing the observation value becomes usable in the CPU 100.

Figure 7:
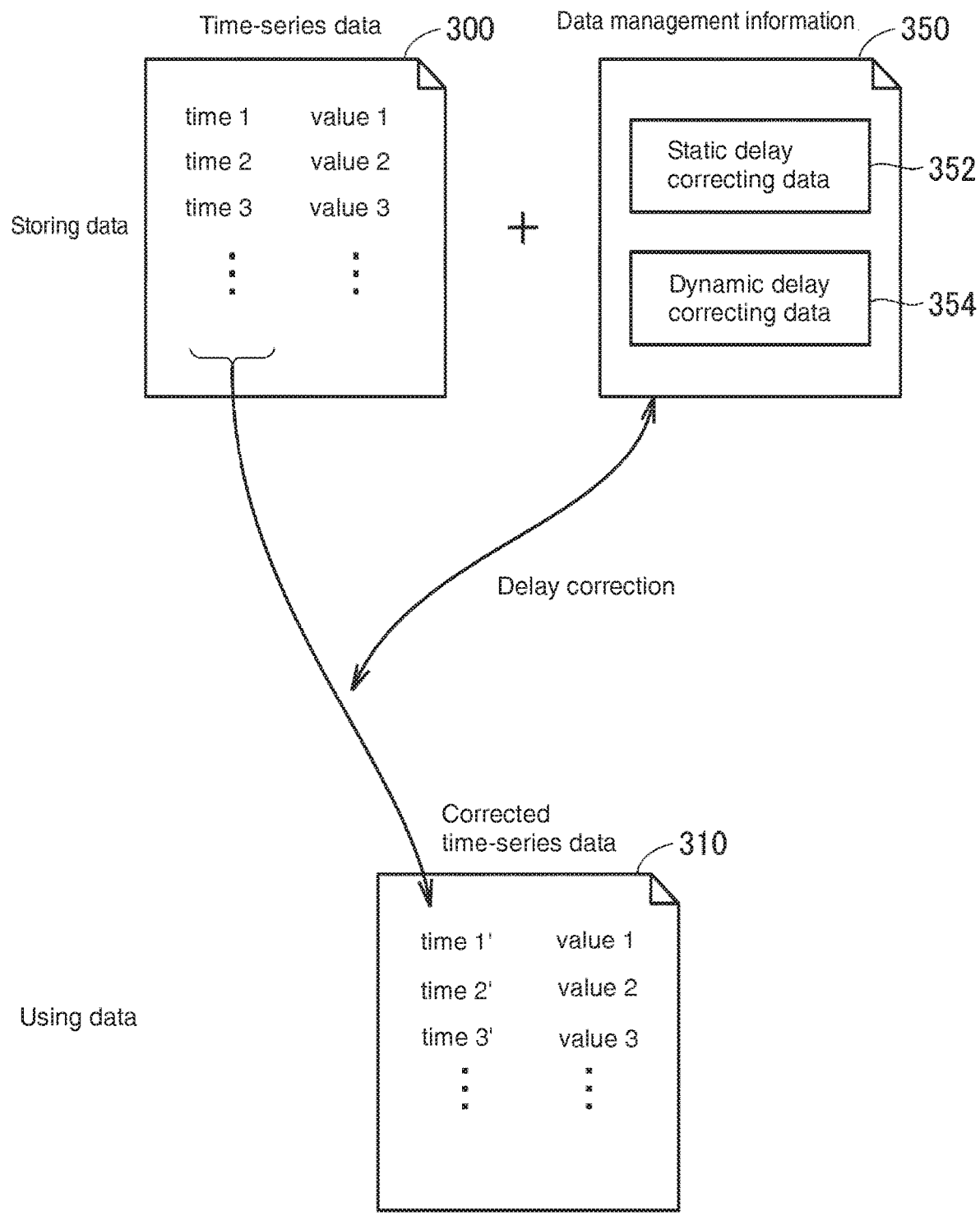
FIG. 7 is a schematic diagram illustrating processing for storing and using data in a control system according to one or more embodiments.

FIG. 7 is a schematic diagram describing processing for storing and using data in the control system 1 according to one or more embodiments. Referring to FIG. 7, when data is stored into the embedded database 180, time-series data 300 is generated. The time-series data 300 contains sets of measurement times and observation values, which are arranged in order of measurement times.

The time-series data used herein refers to a series of values obtained by continuously (or intermittently) detecting chronological changes in data (observation values) for a predetermined target.

Data management information 350 associated with the time-series data 300 is generated. The data management information 350 contains information including delay times associated with the observation values in the time-series data 300. The data management information 350 includes static delay correcting data 352 used to correct a delay predetermined in accordance with the network configuration and the hardware configuration of the control system 1 (or a static delay), and dynamic delay correcting data 354 used to correct a delay varying depending on any synchronization fluctuations and external disturbance factors in the network (or a dynamic delay).

A static delay serves as a non-time-varying delay, whereas a dynamic delay serves as a time-varying delay.

When data is used, the time-series data 300 stored in the embedded database 180 undergoes delay correction using the data management information 350 to generate corrected time-series data 310. The corrected time-series data 310 is used for various analyses.

The time-series data 300 shown in FIG. 7 contains a single observation value for ease of explanation. However, typically, multiple items of time-series data 300 each containing a single observation value, or multiple observation values contained in time-series data 300 are collectively analyzed. In this case as well, the time at which each observation value has actually appeared can be accurately identified, allowing multiple observation values to be analyzed on the common time axis.

D. Software Configuration of Control System

The software configuration implementing the main part of the control system 1 according to one or more embodiments will now be described.

Figure 8:
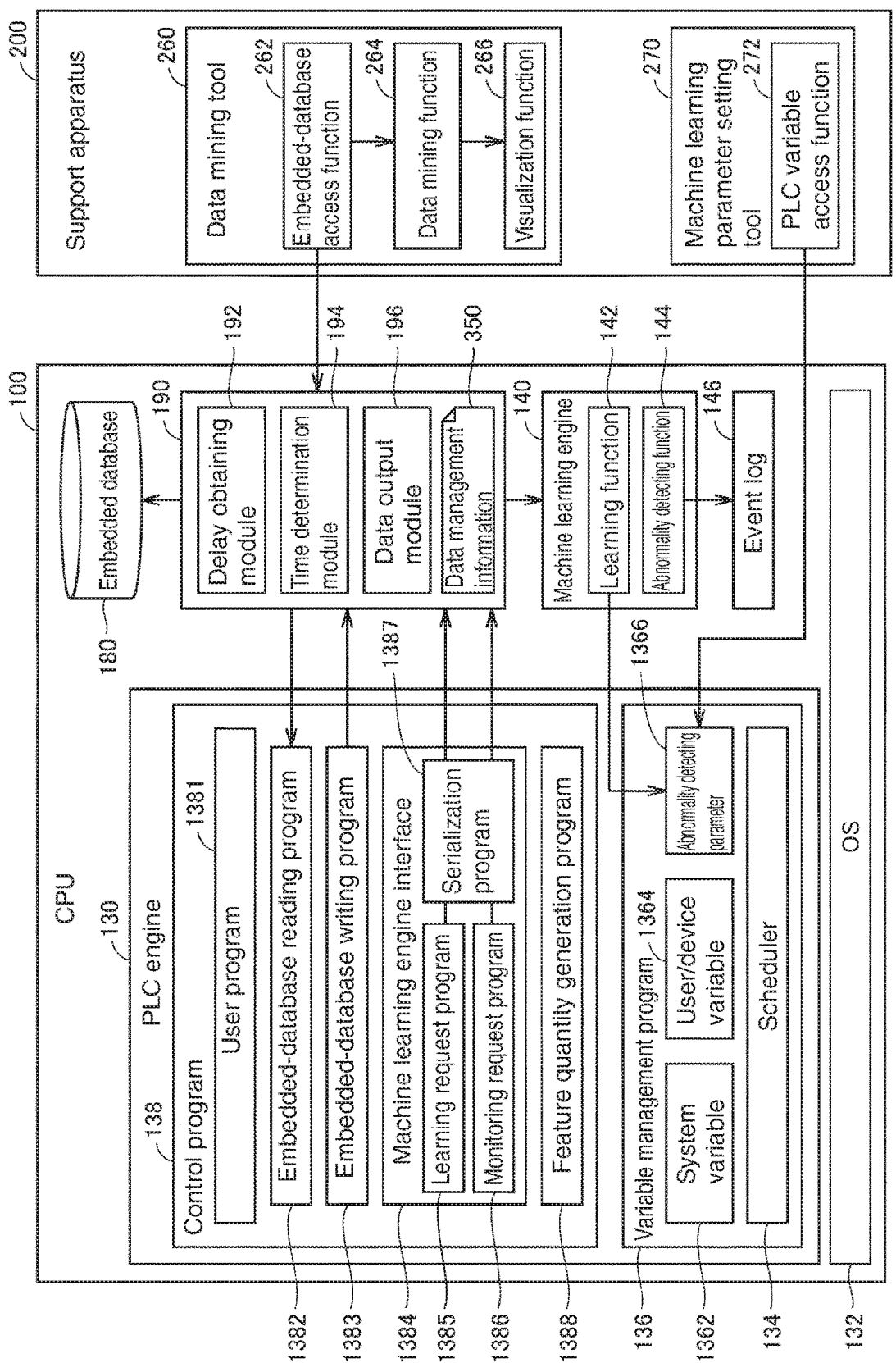
FIG. 8 is a block diagram illustrating the software configuration of a CPU and a support apparatus included in a control system according to one or more embodiments.

FIG. 8 is a block diagram showing the software configuration of the CPU 100 and the support apparatus 200 included in the control system 1 according to one or more embodiments. As an example use of data stored in the embedded database 180, the configuration shown in FIG. 8 performs machine learning based on the time-series data about the feature quantities calculated from the observation-value time-series data or the observation values, and detect any abnormality using the learning results from the machine learning. However, the function of machine learning is not essential to one or more embodiments but is optional.

Referring to FIG. 8, the CPU 100 includes a PLC engine 130, a machine learning engine 140, the embedded database 180, and an embedded-database management service 190.

The PLC engine 130 is typically provided with an environment for executing various programs with the processor 102 in the CPU 100 reading a system program stored in the secondary storage 108, and expanding the program in the main memory 106 and executing the program. The PLC engine 130 may execute various programs in this execution environment.

More specifically, the PLC engine 130 includes a scheduler 134, a variable management program 136, and a control program 138.

The scheduler 134 manages, for example, resource allocation and execution timing for a process or a task performed in the CPU 100.

The variable management program 136 manages values usable in the PLC engine 130 (CPU 100) in the form of variables. More specifically, the variable management program 136 manages, for example, a system variable 1362, a user/device variable 1364, and an abnormality detecting parameter 1366. The system variable 1362 indicates, for example, the states of the CPU 100 and connected devices. The user/device variable 1364 indicates a value generated or updated by a program executed in the CPU 100 and a value held in any device connected to the CPU 100 with a local bus or a fieldbus. The abnormality detecting parameter 1366 indicates, for example, a threshold value used to detect an abnormality in the machine learning engine 140.

The scheduler 134 and the variable management program 136 may also be implemented using some of the system programs. In this case, a single system program may also achieve the functions provided by the programs.

The control program 138 typically includes a user program 1381, an embedded-database reading program 1382, an embedded-database writing program 1383, a machine learning engine interface 1384, and a feature quantity generation program 1388.

The user program 1381 includes sequence computation and motion computation instructions created for control targets such as equipment and machinery.

The embedded-database reading program 1382 is typically called by an instruction defined in the user program 1381, and reads specified data from the embedded database 180. When data is read from the embedded database 180, the data may be subjected to the delay correction described later as appropriate. The delay correction may use the data management information 350 obtained in advance.

The embedded-database writing program 1383 is typically called by an instruction defined in the user program 1381, and writes specified data into the embedded database 180. Typically, the embedded-database writing program 1383 writes observation values collected through the function unit 150 into the embedded database 180. When data is written into the embedded database 180, the corresponding data management information 350 may be generated and stored as appropriate.

The machine learning engine interface 1384 instructs the machine learning engine 140 to execute processing in response to an instruction specified in the user program 1381. More specifically, the machine learning engine interface 1384 includes a learning request program 1385, a monitoring request program 1386, and a serialization program 1387.

The learning request program 1385 requests the machine learning engine 140 to write, as learning results, specified observation values or feature quantities calculated from the observation values.

The monitoring request program 1386 transmits specified observation values or feature quantities calculated from the observation values to the machine learning engine 140 to request the machine learning engine 140 to determine whether an abnormality has occurred.

The serialization program 1387 serializes data to be written into the embedded database 180. The serialization program 1387 also deserializes data read from the embedded database 180. Serialization corresponds to converting target data into a storable byte string, whereas deserialization corresponds to the inversion of serialization. The serialization or deserialization may not be performed depending on the speed and capacity of access to the embedded database 180. In other words, the serialization program 1387 is optional.

The feature quantity generation program 1388 is typically called by an instruction defined in the user program 1381, and processes specified observation values in a predetermined manner to calculate feature quantities.

The machine learning engine 140 provides the described machine learning function. The machine learning engine 140 is typically implemented by the processor 102 in the CPU 100 reading a system program stored in secondary storage 108, and expanding the program in the main memory 106 and executing the program. However, the PLC engine 130 and the machine learning engine 140 may also be executed by the processor 102 in different processes. The different processes allow the PLC engine 130 to control the timing to start the machine learning engine 140.

More specifically, the machine learning engine 140 includes a learning function 142 and an abnormality detecting function 144. The learning function 142 labels observation values obtained from the PLC engine 130 or feature quantities calculated from the observation values, and stores the labeled values as learning results. When receiving observation values obtained from the PLC engine 130 or feature quantities calculated from the observation values, the abnormality detecting function 144 compares the received values with the prepared learning results. The abnormality detecting function 144 detects an abnormality based on whether an evaluation value indicating, for example, the degree of deviation from the learning results is higher than a threshold value defined as the abnormality detecting parameter 1366. When detecting an abnormality, the abnormality detecting function 144 may output an event log 146 including the details of the detected abnormality.

The embedded database 180 is typically implemented by a data storage area located in the main memory 106 or the secondary storage 108 (refer to FIG. 2) and a database management process for adding or deleting data to or from the storage area, and updating or searching for data in the storage area. The embedded database 180 stores time-series data written by the embedded-database writing program 1383.

The database management process included in the embedded database 180 responds to an external request (query) with specified data. The database management process is typically implemented by the processor 102 in the CPU 100 reading a system program stored in the secondary storage 108, and expanding the program in the main memory 106 and executing the program.

The embedded-database management service 190 manages writing and reading data to and from the embedded database 180. The embedded-database management service 190 includes a delay obtaining module 192, a time determination module 194, and a data output module 196.

The delay obtaining module 192 generates the data management information 350 by the processing described below. More specifically, the delay obtaining module 192 obtains the delay time associated with an observation value, and stores the information indicating the obtained delay time (data management information 350). As described above, the data management information 350 may include the static delay correcting data 352 and the dynamic delay correcting data 354.

The time determination module 194 determines the time at which the signal indicating the observation value has appeared based on the information indicating the delay time (data management information 350) obtained from the delay obtaining module 192. More specifically, the time determination module 194 calculates the time at which the input signal representing the observation value in the target has actually been input into the function unit 150, or the time at which the input signal representing the observation value in the target has actually appeared.

In the PLC engine 130, an observation value is associated with a time. The time determination module 194 thus corrects the delay time with respect to the time defined in the time-series data stored in the embedded database 180 to determine the time at which the signal indicating the observation value has appeared.

The delay correction may be performed when data is written into or read from the embedded database 180. More specifically, the time determination module 194 may correct a delay when (1) writing data obtained from the PLC engine 130 into the embedded database 180, (2) reading data requested by the PLC engine 130 from the embedded database 180 and responding to the request, or (3) reading data from the embedded database 180 and outputting the data to, for example, the machine learning engine 140.

The data output module 196, in response to an external request, outputs time-series data read from the embedded database 180 together with the data management information 350 associated with the read time-series data. More specifically, the data output module 196 outputs the observation values stored in the embedded database 180 together with the information indicating the delay times associated with the observation values (data management information 350). Both of the static delay correcting data 352 and the dynamic delay correcting data 354 included in the data management information 350 may be output in a manner associated with each other, or either data may be output.

The support apparatus 200 may have various functions for machine learning. For example, the support apparatus 200 according to one or more embodiments has a data mining tool 260 and a machine learning parameter setting tool 270.

The data mining tool 260 provides functions for searching the observation-value time-series data stored in the embedded database 180 for a feature quantity or a sign appropriate for detecting an abnormality that may occur in a control target. More specifically, the data mining tool 260 includes an embedded-database access function 262, a data mining function 264, and a visualization function 266.

The embedded-database access function 262 transmits a request (query) to the CPU 100 to obtain intended data from the embedded database 180.

The data mining function 264 analyzes the data obtained from the embedded database 180 to determine an abnormality detecting technique and a feature quantity appropriate for detecting an abnormality that may occur in a control target. The data mining function 264 may also determine a threshold value (abnormality detecting parameter 1366) appropriate for the determined feature quantity and the determined abnormality detecting technique. The data mining function 264 may further assess the validity of the determined feature quantity, the determined abnormality detecting technique, and the determined abnormality detecting parameter.

The visualization function 266 visually presents the details determined by the data mining function 264 to the user. The visualization function 266 may also have a function for graphing the analysis results and the accuracy of abnormality detection.

The machine learning parameter setting tool 270 has a PLC variable access function 272, and sets, for example, the threshold value determined by the data mining function 264 to the abnormality detecting parameter 1366 in the CPU 100.

E. Delay Correction

The delay correction in the control system 1 according to one or more embodiments will now be described.

e1: Overall Processing for Delay Correction

The control system 1 according to one or more embodiments has a function-unit-caused delay d1 and a basic communication delay d2 as static delays, and a dynamic communication delay d3 as a dynamic delay.

The function-unit-caused delay d1 is a delay time taken until a signal input into the function unit 150 is transmitted as data to the CPU 100 or the coupler unit 160. More specifically, the function-unit-caused delay d1 corresponds to a delay that depends on at least one of the processing characteristics defined in the function unit 150 (e.g., a sampling period and filter characteristics) and the function of the function unit 150 (e.g., the AI function or the DI function).

The basic communication delay d2 is a delay time taken to transmit data from the function unit 150 to the CPU 100. More specifically, the basic communication delay d2 corresponds to a delay that depends on the data transmission path from the function unit 150 to the CPU 100 (the processor 102). More specifically, the basic communication delay d2 corresponds to the sum of a propagation delay time for one communication period of constant cycle communication and a propagation delay time that depends on the cable length of the local bus or the fieldbus.

The basic communication delay d2 is calculated based on the time taken to transmit a time synchronization signal from the CPU 100 to the local bus or the fieldbus and then return to the CPU 100.

A common local bus has a communication cycle and a transmission distance that are sufficiently shorter than those of a fieldbus. Thus, the basic communication delay d2 may be simply based on the data transmission on the fieldbus.

The function-unit-caused delay d1 and the basic communication delay d2 are typically determined for each obtained observation value. However, for a function unit 150 that can receive multiple input signals and has the same input setting for each input signal, the observation values of signals input into the function unit 150 may share the same function-unit-caused delay d1 and the same basic communication delay d2. In this case, the function-unit-caused delay d1 and the basic communication delay d2 may also be determined for each function unit 150.

The dynamic communication delay d3 is sequentially calculated by the synchronization management function of the local bus controller or the fieldbus controller, which serves as a communication master. More specifically, the communication master sequentially monitors the difference between the counter values indicated by its counter and the counter in the connected communication slave. When the difference exceeds a predetermined value, the communication master transmits a time synchronization signal to the local bus or the fieldbus to synchronize the times. The dynamic communication delay d3 corresponds to the difference between the counter values indicated by the counter in the communication master and the counter in the communication slave.

Figure 9:
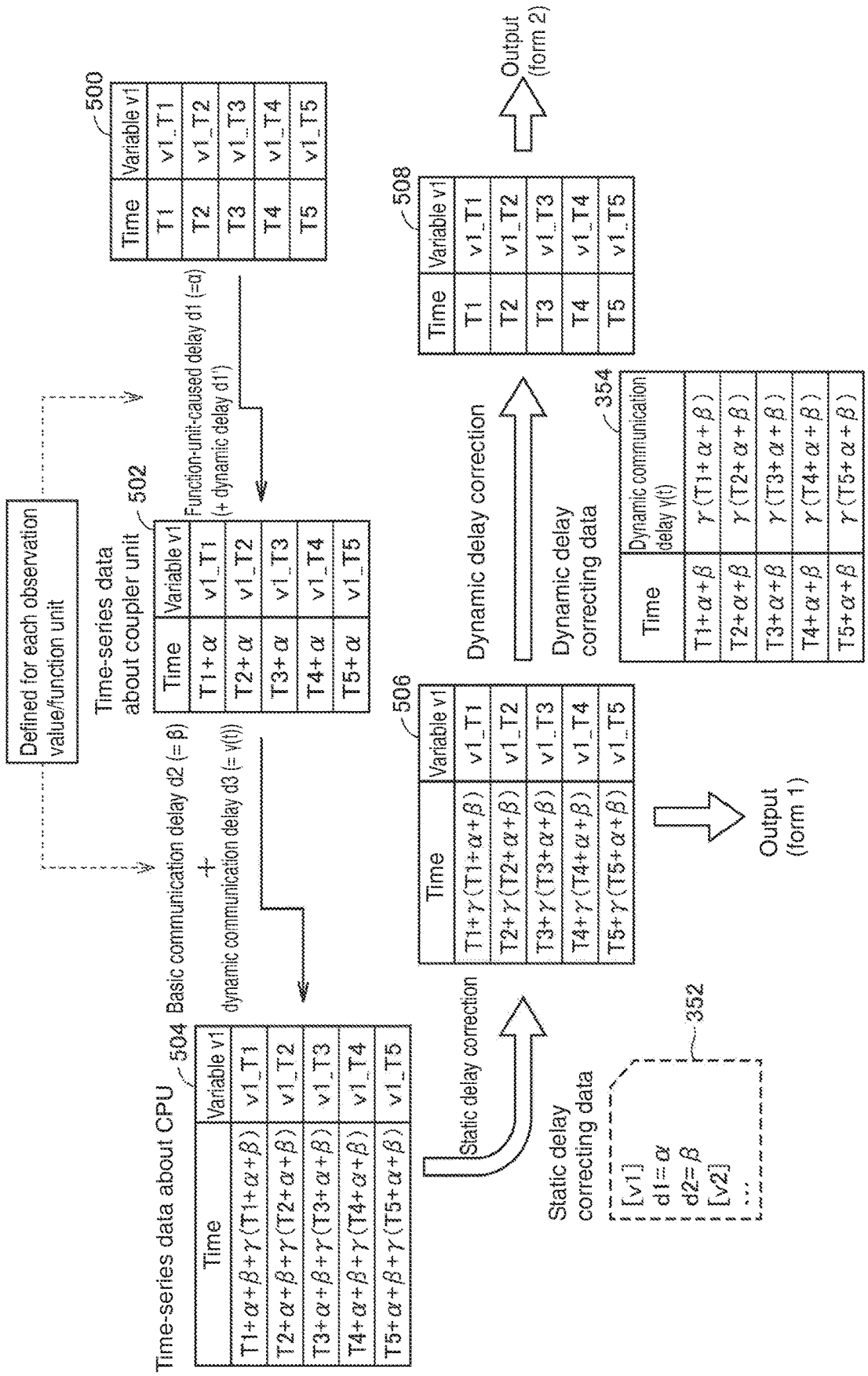
FIG. 9 is a diagram illustrating the overall processing of delay correction in a control system according to one or more embodiments.

FIG. 9 is a diagram describing the overall processing of delay correction in the control system 1 according to one or more embodiments. FIG. 9 shows an example in which a signal from a sensor is input into a function unit 150 mounted on a coupler unit 160.

Referring to FIG. 9, an input signal 500 (corresponding to a signal output from a sensor) input into any function unit 150 reaches a coupler unit 160 after a function-unit-caused delay d1 (=delay time $\alpha$). More specifically, time-series data 502 representing an input signal into the coupler unit 160 has the times associated with observation values that are behind the original times by the delay time $\alpha$.

In addition, data transmission from the coupler unit 160 to the CPU 100 causes a basic communication delay d2 (=delay time $\beta$) and a dynamic communication delay d3 (=delay time $\gamma(t)$). More specifically, time-series data 504 representing an input signal into the CPU 100 has the times associated with the observation values that are behind the original times by the delay time $\gamma(t)$ in addition to the delay time $\beta$. The delay time $\gamma(t)$ indicating the degree of the dynamic communication delay time d3 varies over time, and thus can be defined as a function of time t.

The control operation performed by the CPU 100 typically uses the time-series data 504 shown in FIG. 9. The time-series data 504 is stored in the embedded database 180. The control system 1 according to one or more embodiments corrects the delay time with respect to the time in the time-series data 504 in the CPU 100.

As shown in FIG. 9, the static delay correcting data 352 includes a set of the delay time $\alpha$ indicating the degree of the function-unit-caused delay d1 and the delay time $\beta$ indicating the degree of the basic communication delay d2. The set of the delay time $\alpha$ and the delay time $\beta$ is defined for each observation value (variable) or for each function unit.

As shown in FIG. 9, the dynamic delay correcting data 354 includes the delay time $\gamma(t)$ indicating the degree of the dynamic communication delay d3. The delay time $\gamma(t)$ is defined as a value for each time. The dynamic delay correcting data 354 also represents the state of the transmission path, and may thus be defined for each local bus or each fieldbus, or for each communication slave.

In FIG. 9, the propagation delay in the local bus connecting the coupler unit 160 and the function unit 150 is negligible for ease of explanation. However, the propagation delay time may be included in the basic communication delay d2 or the dynamic communication delay d3.

In one or more embodiments, the delay caused by the function unit 150 is the function-unit-caused delay d1, which is a static delay. However, a dynamic delay caused by fluctuations in the processing performed in the function unit 150 may also be added (corresponding to a dynamic delay d1' shown in FIG. 9). The dynamic delay d1' may be sequentially detected by the function unit 150 or the coupler unit 160. For example, the function unit 150 includes a high-precision crystal oscillator with a temperature compensation function, which generates pulses used to detect dynamic delay d1' as a time lag.

Although FIG. 9 shows an example in which a signal from a sensor is input into the function unit 150 mounted on the coupler unit 160, a signal from the sensor may be input into a function unit 150 mounted on the CPU 100. In this case, the CPU 100 obtains the time-series data 502 instead of the time-series data 504 shown in FIG. 9.

In the CPU 100, observation values including delay as described above are stored in the embedded database 180. More specifically, the processor 102 in the CPU 100 (specifically, the embedded-database writing program 1383 executed by the processor 102) writes, in the embedded database 180, data such as the time-series data 504 associating observation values with the times when the observation values become usable in the CPU 100.

In correcting delays for the time-series data 504 in the CPU 100, the time determination module 194 (FIG. 8) first refers to the static delay correcting data 352 to reduce the times stored in the time-series data 504 by the delay time α and the delay time β, which are static delays. The times stored in the time-series data 504 are the times associated with the observation values in the CPU 100. For observation values received within a control period, for example, a reference time for the control period may be used.

The static delay correction described above generates static delay corrected data 506. The static delay corrected data 506 can be directly used in some applications. The static delay corrected data 506 may thus be output with no correction. In this case, the dynamic delay correcting data 354 may be output together with the static delay corrected data 506.

In addition, the time determination module 194 (FIG. 8) refers to the dynamic delay correcting data 354 to reduce the times in the static delay corrected data 506 by the corresponding delay times γ(t). The dynamic delay correction generates dynamic delay corrected data 508. The dynamic delay corrected data 508 is time-series data including the accurate times when the corresponding observation values have actually appeared. The dynamic delay corrected data 508 may also be output.

As described above, the time determination module 194 (FIG. 8) corrects the time associated with an observation value read from the embedded database 180 based on the information indicating the delay time obtained by the delay obtaining module 192 (FIG. 8) (data management information 350) to determine the time at which the signal corresponding to the observation value has appeared.

The static correction and dynamic correction shown in FIG. 9 may be performed after the time-series data 504 is stored in the embedded database 180 and then read from the embedded database 180. The time-series data 504 may be subjected to static correction or dynamic correction to generate the static delay corrected data 506 or the dynamic delay corrected data 508, and the resultant data may be written into the embedded database 180. With the static delay correcting data 352 and the dynamic delay correcting data 354 prepared, the delay correction may be performed in any phase. The delay correction may also be performed by the CPU 100 or an external device such as the support apparatus 200.

Although the static correction and the dynamic correction in one or more embodiments are separately performed for ease of explanation, the static correction and the dynamic correction may also be performed at the same time.

e2: Delay Correcting Data

The static delay correcting data 352 and the dynamic delay correcting data 354 for delay correction according to one or more embodiments will now be described. These data items are included in the data management information 350.

Figure 10:
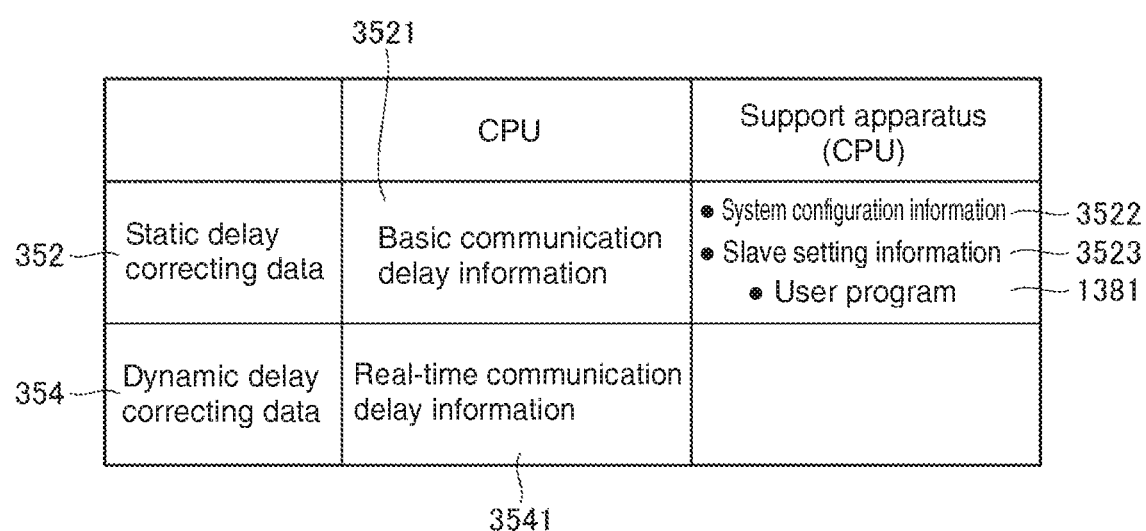
FIG. 10 is a table illustrating details of data management information used in a control system according to one or more embodiments.

FIG. 10 is a table showing the details of the data management information 350 used in the control system 1 according to one or more embodiments. Referring to FIG. 10, the data management information 350 includes at least one of the static delay correcting data 352 and the dynamic delay correcting data 354.

The static delay correcting data 352 is generated based on information such as (1) basic communication delay information 3521 held in the CPU 100, (2) system configuration information 3522 held in the support apparatus 200, (3) slave setting information 3523 held in the support apparatus 200, and (4) the user program 1381 held in the support apparatus 200.

The basic communication delay information 3521 includes a delay time corresponding to the basic communication delay d2 shown in FIG. 9. The delay time depends on, for example, the cable length of the local bus or fieldbus. The delay included in the basic communication delay information 3521 is measured and obtained at the startup of the CPU 100.

The system configuration information 3522 includes information used to calculate the basic communication delay d2 shown in FIG. 9. More specifically, the system configuration information 3522 includes information such as the number, the type, and the topology of function units 150 connected to the local bus or the fieldbus. The system configuration information 3522 is used to determine a delay time caused by, for example, the number of function units 150 (corresponding to communication slaves) connected to the local bus or the fieldbus.

The slave setting information 3523 includes information used to calculate the function-unit-caused delay d1 shown in FIG. 9. More specifically, the slave setting information 3523 includes the information about set values (e.g., a sampling period and filter characteristics) for each of the function units 150 mounted on the CPU 100 and the function units 150 mounted on the coupler unit 160. The slave setting information 3523 is used to determine a delay time taken from when a signal from a sensor is input into the function unit 150 to when the signal is actually output as data.

The user program 1381 may be used to calculate the basic communication delay d2 shown in FIG. 9. More specifically, the user program 1381 includes an instruction set to be executed in the CPU 100. The instruction set is written as individual tasks. Each task has a predefined execution period. The user program 1381 is analyzed to estimate a user variable update period. More specifically, the user program 1381 is analyzed to identify the tasks that have update instructions for user variables, and the execution period for each task is referred to. This process determines the update period for each user variable.

The system configuration information 3522, the slave setting information 3523, and the user program 1381 may be transferred to the CPU 100. In this case, these information items held in the CPU 100, not in the support apparatus 200, may be referred to.

When the CPU 100 can actually measure the basic communication delay d2 shown in FIG. 9, the system configuration information 3522 and the user program 1381 may not be referred to. However, the basic communication delay d2 may not be actually measured for all of the function units 150. In that case, the basic communication delay d2 may be calculated or estimated by referring to the system configuration information 3522 and the user program 1381.

The dynamic delay correcting data 354 is generated based on real-time communication delay information 3541. The dynamic delay correcting data 354 includes a change in a delay time during each time period, and may be typically defined for each function unit 150.

The real-time communication delay information 3541 includes the information about the degree of each communication slave delay after the basic communication delay d2. The communication master (the local bus controller or the fieldbus controller, which function as a communication masters, as described above) calculates the degree of delay based on a response from the connected communication slave. The calculated delay time corresponds to the real-time communication delay information 3541. The communication master outputs a time synchronization signal to be used in correcting times for each communication slave based on the calculated delay time.

The dynamic delay correcting data 354 includes a delay time within each time period included in the real-time communication delay information 3541. The real-time communication delay information 3541 includes a delay time corresponding to the dynamic communication delay d3 shown in FIG. 9. The real-time communication delay information 3541 is sequentially updated by the CPU 100 (specifically, the local bus controller or the fieldbus controller functioning as the communication master).

More specifically, the communication master starts time measurement at an execution time for I/O refresh, and ends the time measurement at the reception of a response to the I/O refresh from each communication slave. The communication master calculates the dynamic communication delay d3 by subtracting the basic communication delay d2 from the measured time. The I/O refresh is the processing of updating an input value from each communication slave, and an output value and a command value to each communication slave. In the I/O refresh, the communication master transmits a frame used for the I/O refresh to each communication slave. When receiving the communication frame from the communication master, the communication slave reads an output value or a command value in the frame, and then responds to the communication master with an input value obtained in advance.

The execution time for I/O refresh is when the communication master transmits a frame used for the I/O refresh, and a time taken for each communication slave to respond to the frame corresponds to the communication delay including static delay and dynamic delay.

e3: Implementation of Delay Correction

An implementation for delay correction according to one or more embodiments will now be described.

Figure 11:
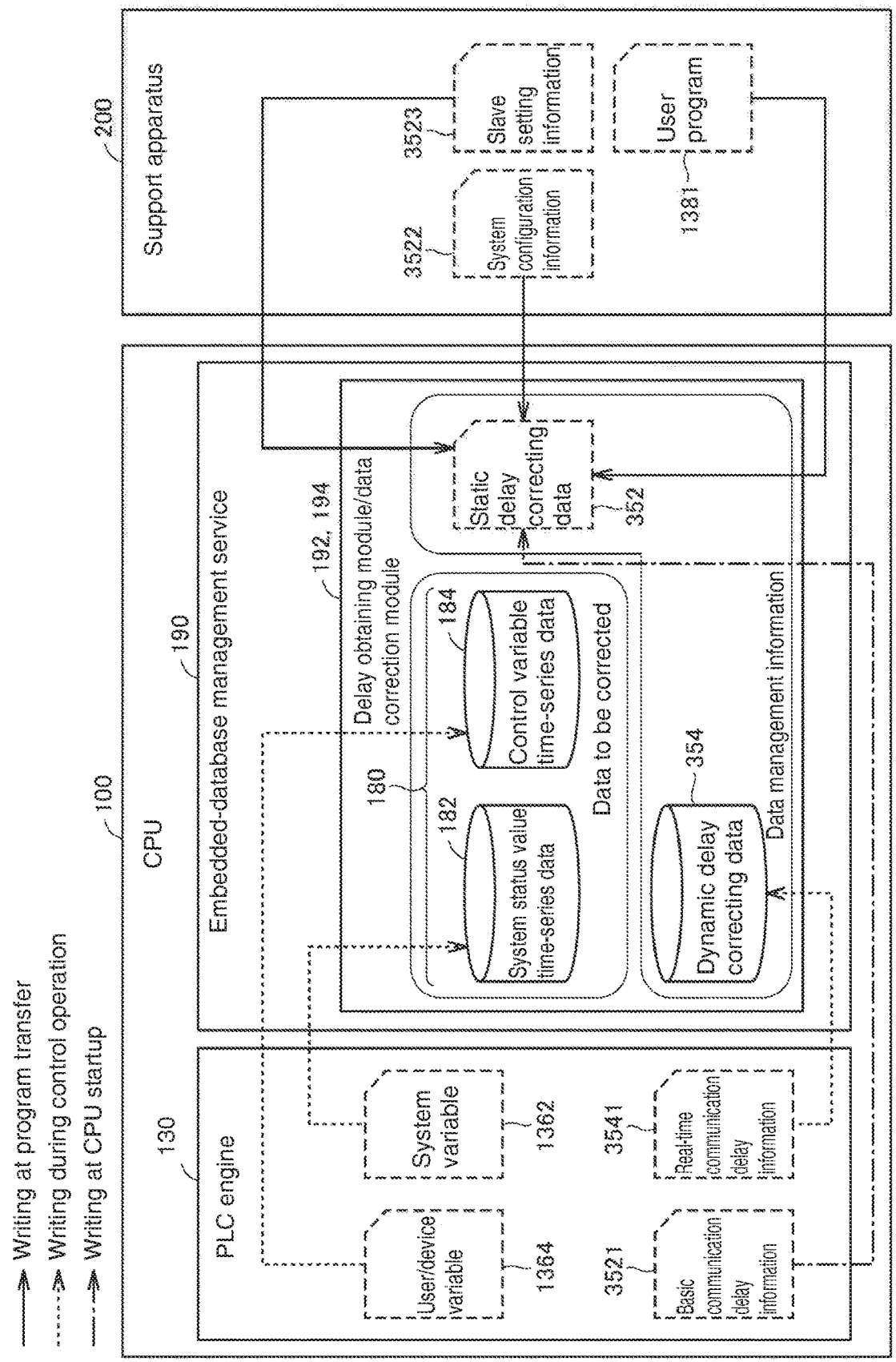
FIG. 11 is a schematic diagram illustrating an implementation of delay correction in a control system according to one or more embodiments.

FIG. 11 is a schematic diagram showing the implementation of delay correction in the control system 1 according to one or more embodiments. Referring to FIG. 11, the CPU 100 includes the PLC engine 130 and the embedded-database management service 190 as components for the delay correction according to one or more embodiments.

The PLC engine 130 manages the system variable 1362 and the user/device variable 1364 (refer to, for example, FIG. 8). The PLC engine 130 also generates and updates the basic communication delay information 3521 and the real-time communication delay information 3541.

The embedded-database management service 190 performs processing in cooperation with the embedded database 180. The embedded-database management service 190 is a task for writing and reading data to and from the embedded database 180. The embedded-database management service 190 is typically implemented by the processor 102 in the CPU 100 reading a system program stored in the secondary storage 108, expanding the program in in the main memory 106 and executing the program.

In the implementation shown in FIG. 11, the embedded-database management service 190 writes system status value time-series data 182 and control variable time-series data 184 into the embedded database 180. The system status value time-series data 182 includes the time-series data about predetermined variables included in the system variable 1362. The control variable time-series data 184 includes the time-series data about predetermined variables included in the user/device variable 1364. The system status value time-series data 182 and the control variable time-series data 184 are delay correction targets (data to be corrected).

The system status value time-series data 182 and the control variable time-series data 184 are expected to have different update frequencies, and thus both items of the time-series data are stored as separate data files. However, the system status value time-series data 182 and the control variable time-series data 184 may also be stored as a single data file.

The embedded-database management service 190 (the delay obtaining module 192 shown in FIG. 8) generates or updates the static delay correcting data 352 and the dynamic delay correcting data 354. The static delay correcting data 352 and the dynamic delay correcting data 354 may be stored in the embedded database 180. The static delay correcting data 352 and the dynamic delay correcting data 354 may also be stored in the secondary storage 108 or the memory card 116 (refer to FIG. 2).

More specifically, for subsequent delay correction to the system status value time-series data 182 and the control variable time-series data 184, the static delay correcting data 352 and the dynamic delay correcting data 354 may be associated with the system status value time-series data 182 and the control variable time-series data 184 in a predetermined manner, and then may be stored.

When the system status value time-series data 182 and the control variable time-series data 184 are written into the embedded database 180 after undergoing delay correction, the static delay correcting data 352 and the dynamic delay correcting data 354 may not be subsequently used. The correcting data may thus be discarded after the delay correction.

The support apparatus 200 holds the system configuration information 3522, the slave setting information 3523, and the user program 1381, which are defined or developed by a user.

In the implementation shown in FIG. 11, data is updated or generated (1) when a program is downloaded from the support apparatus 200 to the CPU 100, (2) during the control operation in the CPU 100, and (3) at the startup of the CPU 100.

(1) When a program is downloaded from the support apparatus 200 to the CPU 100, the static delay correcting data 352 may be generated or updated using the information held in the support apparatus 200.

More specifically, when the intended data is transferred from the support apparatus 200 to the CPU 100, the embedded-database management service 190 refers to the system configuration information 3522 and the slave setting information 3523 to calculate the function-unit-caused delay d1 and the basic communication delay d2, and stores the delays as the static delay correcting data 352. More specifically, the embedded-database management service 190 obtains delay information from the system configuration information 3522 and the slave setting information 3523.

The embedded-database management service 190 may analyze the user program 1381 to calculate the basic communication delay d2 or the amount of correction to the basic communication delay d2. The calculation results are also included in the static delay correcting data 352.

(2) During the control operation in the CPU 100, the values of the system status value time-series data 182, the control variable time-series data 184, and the dynamic delay correcting data 354 are sequentially updated.

More specifically, in response to a request from, for example, the embedded-database writing program 1383 (refer to FIG. 8), the embedded-database management service 190 writes a specified variable included in the system variable 1362 into the system status value time-series data 182 in specified writing cycles, and writes a specified variable included in the user/device variable 1364 into the control variable time-series data 184 in specified writing cycles.

The variables may also be written rapidly in control operation execution cycles into the system status value time-series data 182 and the control variable time-series data 184.

The embedded-database management service 190 (the time determination module 194 shown in FIG. 8) also generates or updates the dynamic delay correcting data 354 based on the real-time communication delay information 3541 sequentially measured by the communication master. The dynamic delay correcting data 354 may be updated in response to the satisfaction of a predefined condition. The predefined condition may be written as a status definition table.

(3) At the startup of the CPU 100, the value of the static delay correcting data 352 may be updated. As described above, the CPU 100 (specifically, the local bus controller or the fieldbus controller functioning as the communication master) at the startup transmits a time synchronization signal or other signals to measure the delay time corresponding to the basic communication delay d2. The measured delay time is the basic communication delay information 3521. The embedded-database management service 190 may also update the value of the static delay correcting data 352 based on the basic communication delay information 3521.

e4: Procedure for Delay Correction

A procedure for the delay correction according to one or more embodiments will now be described.

Figure 12:
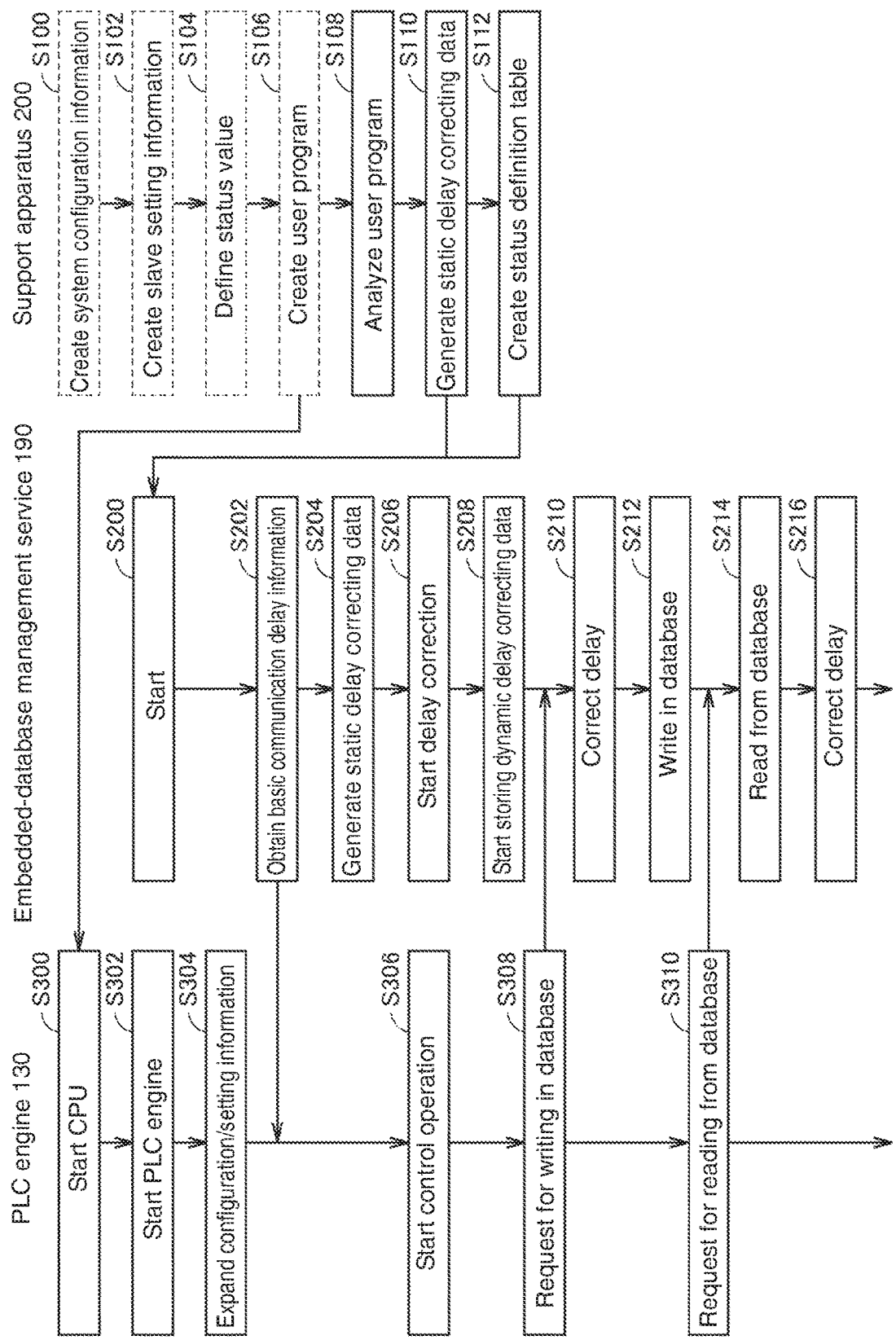
FIG. 12 is a flowchart illustrating a procedure for delay correction in a control system according to one or more embodiments.

FIG. 12 is a flowchart showing the procedure for the delay correction in the control system 1 according to one or more embodiments. FIG. 12 shows communication between the PLC engine 130, the embedded-database management service 190, and the support apparatus 200 in connection with the implementation shown in FIG. 11.

Referring to FIG. 12, various settings are performed and user programs are developed for performing a control operation appropriate for a control target in the CPU 100. The blocks indicated by dashed line in FIG. 12 correspond to processing usually performed by the user.

More specifically, the user operates the support apparatus 200 to create the system configuration information 3522 in accordance with the configuration of the control system 1 (step S100), and create the slave setting information 3523 in accordance with the number, the type, and the topology of function units 150 included in the control system 1 (step S102). The user also defines status values such as the user/device variable 1364 (step S104). When the setting process is complete, the user creates the user program 1381 (step S106).

The user program 1381 created by the user is transmitted (or downloaded) to the CPU 100 (specifically, the PLC engine 130) together with, for example, the system configuration information 3522 and the slave setting information 3523.

When the user completes the processing from steps S100 to S106 using the support apparatus 200, the CPU 100 is ready to execute a control operation.

Subsequent steps S108 to S112 are the processing for generating the static delay correcting data 352.

More specifically, the support apparatus 200 analyzes the user program 1381 to calculate the amount of correction to the basic communication delay d2 or the basic communication delay d2 (step S108). The support apparatus 200 then refers to the system configuration information 3522 and the slave setting information 3523, and uses the analysis results obtained in step S108 to generate the static delay correcting data 352 (step S110). The generated static delay correcting data 352 is transmitted to the CPU 100 (specifically, the system status value time-series data 182).

The support apparatus 200 then creates a status definition table indicating a condition under which the dynamic delay correcting data 354 is updated (step S112). The generated status definition table is transmitted to the CPU 100 (specifically, the system status value time-series data 182).

When the CPU can collect all delay times to be involved in the static delay correcting data 352, the processing of steps S108 and S110 may be eliminated.

The CPU 100 receives the data such as the intended programs and settings, and performs a control operation in accordance with the user program 1381. More specifically, when the CPU 100 is started (step S300), the PLC engine 130 is also started (step S302), and the embedded-database management service 190 is also started (step S200). In step S200, the database service function of the embedded database 180 starts or restarts.

When the embedded-database management service 190 is started, the PLC engine 130 loads the system configuration information 3522 and the slave setting information 3523 received from the support apparatus 200 (step S304). The preceding process enables the PLC engine 130 in the CPU 100 to execute a control operation.

More specifically, the PLC engine 130 starts the control operation including the execution of the user program 1381 (step S306). The PLC engine 130 may generate a request for writing data into the database in response to an instruction included in the user program 1381 (step S308). The request for writing data is provided to the embedded-database management service 190. The PLC engine 130 may also generate a request for reading data from the database in response to an instruction included in the user program 1381 (step S310). The request for reading data is provided to the embedded-database management service 190.

The embedded-database management service 190, after its startup (step S200), requests the PLC engine 130 to obtain the basic communication delay information 3521 (step S202). The PLC engine 130 responds to the embedded-database management service 190 with the basic communication delay information 3521 measured at the startup. The embedded-database management service 190 generates the static delay correcting data 352 based on the basic communication delay information 3521 from the PLC engine 130 (step S204).

Through the processing in step S204 and the previous steps, a minimum set of information used in delay correction is obtained. The embedded-database management service 190 thus starts the delay correction (step S206). The embedded-database management service 190 also starts updating the dynamic delay correcting data 354 (step S208). In updating the dynamic delay correcting data 354, when a predefined condition is satisfied, the embedded-database management service 190 obtains the real-time communication delay information 3541 from the PLC engine 130 to update the dynamic delay correcting data 354.

The embedded-database management service 190 responds to the database writing request and/or the database reading request from the PLC engine 130 to perform the delay correction.

More specifically, the embedded-database management service 190 responds to the database writing request to correct a delay in the times associated with specified observation values (variables) (step S210). The embedded-database management service 190 writes the corrected data into the embedded database 180 (step S212).

The embedded-database management service 190 also responds to the database reading request to read the time-series data about specified observation values (variables) from the embedded database 180 (step S214). The embedded-database management service 190 corrects a delay in the read time-series data (step S216), and responds to the PLC engine 130 with the corrected data.

Either the delay correction in step S210 and the delay correction in S216 may be performed, or neither the data correction may be performed. When neither the delay correction is performed, the time-series data about specified observation values and the data management information 350 may be output in a manner associated with each other.

While the PLC engine 130 is cyclically performing the control operation, the embedded-database management service 190 repeatedly performs the processing in steps S210 to S216.

e5: Function-Unit-Caused Delay d1 and Basic Communication Delay d2 (Static Delay)

Specific examples of the function-unit-caused delay d1 and the basic communication delay d2 (static delay) to be addressed in the delay correction according to one or more embodiments will now be described.

A possible delay time (static delay) varies depending on the type of function unit 150 that receives an input signal from a control target. Thus, the type and the setting of function unit 150 mounted on the CPU 100 or the coupler unit 160 are identified, and then the delay time to be corrected is determined. The type and the setting of function unit 150 may be obtained by referring to system configuration information and slave setting information held in the CPU 100 or other units.

Specific examples of the function-unit-caused delay d1 and the basic communication delay d2 (static delay) will now be described.

FIGS. 13A to 13D are time charts indicating typical input processing performed by a function unit 150 in the control system 1 according to one or more embodiments. FIGS. 14A to 14D are time charts indicating input processing with oversampling performed by a function unit 150 in the control system 1 according to one or more embodiments.

FIGS. 13A to 13D show an example in which an output signal from a photoelectric sensor for detecting a workpiece is input into the function unit 150. The time charts shown in FIGS. 13A to 13D correspond to the processing performed when an output signal from the sensor is input into the function unit 150 mounted on a coupler unit 160.

For example, when a workpiece passes a detection position, the workpiece blocks the photoelectric sensor light. The resulting sensor output is as shown in FIG. 13D. The function unit 150 subjects the sensor output to filtering, AD conversion, and other processing to generate a binarized on/off detection signal. FIG. 13C shows a time waveform of the signal output from the function unit 150 in response to the sensor output shown in FIG. 13D.

The output signal from the function unit 150 shown in FIG. 13C may have the function-unit-caused delay d1 due to, for example, a filter. More specifically, the output signal from the function unit 150 may have a delay time due to the filter time constant set in the function unit 150 and an AD conversion delay.

The output signal from the function unit 150 is transmitted to the CPU 100 via the coupler unit 160. The transmission path from the function unit 150 to the coupler unit 160 and the transmission path from the coupler unit 160 to the CPU 100 are included in a network that allows constant cycle communication, which may cause a delay of one communication period. More specifically, the output signal from the coupler unit 160 shown in FIG. 13B may have a delay caused by the constant cycle communication (part of the basic communication delay d2).

Figure 13A:
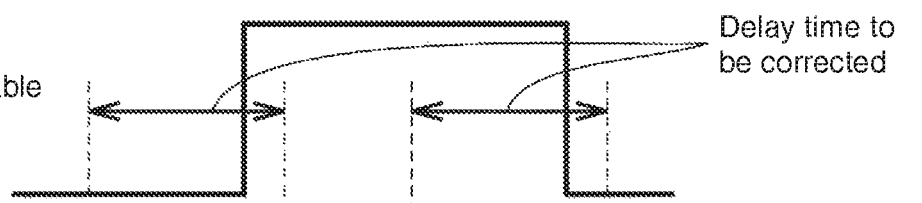
FIGS. 13A to 13D are time charts illustrating typical input processing performed by a function unit in a control system according to one or more embodiments.
Figure 13B:
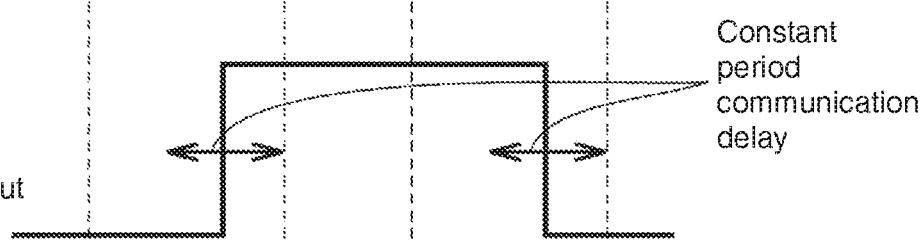
Figure 13C:
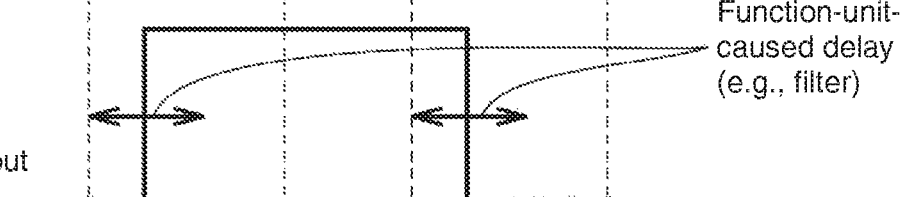
Figure 13D:
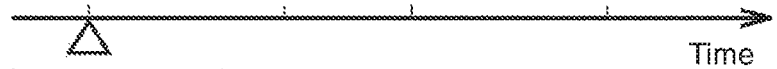

The sum of the transmission path delay times as shown in FIGS. 13B to 13D provides a delay time to be corrected in the sensor variable indicating the sensor output from the CPU 100 (refer to FIG. 13A).

The delay time to be corrected shown in FIG. 13A can be estimated by referring to the system configuration information about the fieldbus connecting the CPU 100 to the coupler unit 160 and the slave setting information about the function unit 150 connected to the coupler unit 160.

FIGS. 14A to 14D show an example in which an output signal from a vibration detection sensor is input into the function unit 150. The function unit 150 can sample an input signal for a sampling period shorter than the communication period, and output the results of frequency analysis (e.g., a fast Fourier transform, FFT) of multiple samples. Collecting data for a period shorter than the communication period may also be simply referred to as oversampling.

In one or more embodiments, for example, a sensor output as shown in FIG. 14D appears. The function unit 150 samples the input signal over a predetermined sampling period (refer to FIG. 14C), performs the FFT for the samples, and outputs the FFT results at the timing shown in FIG. 14B. FIG. 14B shows the timing of oversampling output from the function unit 150. The oversampling output from the function unit 150 may have an additional delay of a communication period on the transmission path from the function unit 150 to the CPU 100.

The sum of the transmission path delay times as shown in FIGS. 14B to 14D provides a delay time to be corrected in the sensor variable indicating the sensor output from the CPU 100 (refer to FIG. 14A).

The delay time to be corrected shown in FIG. 14A can be estimated by referring to the system configuration information for identifying the transmission path from the CPU 100 to the function unit 150 and the slave configuration information for identifying the setting in the function unit 150.

e6: Dynamic Communication Delay d3 (Dynamic Delay)

A specific example of the dynamic communication delay d3 (dynamic delay) to be addressed in the delay correction according to one or more embodiments will now be described.

As described above, the local bus controller or the fieldbus controller functioning as a communication master sequentially monitors the time managed by a communication slave (typically, the counter value output from the counter in the communication slave). When a deviation in the time exceeds a threshold, the communication master outputs a time synchronization signal to correct the deviation.

Figure 15A:
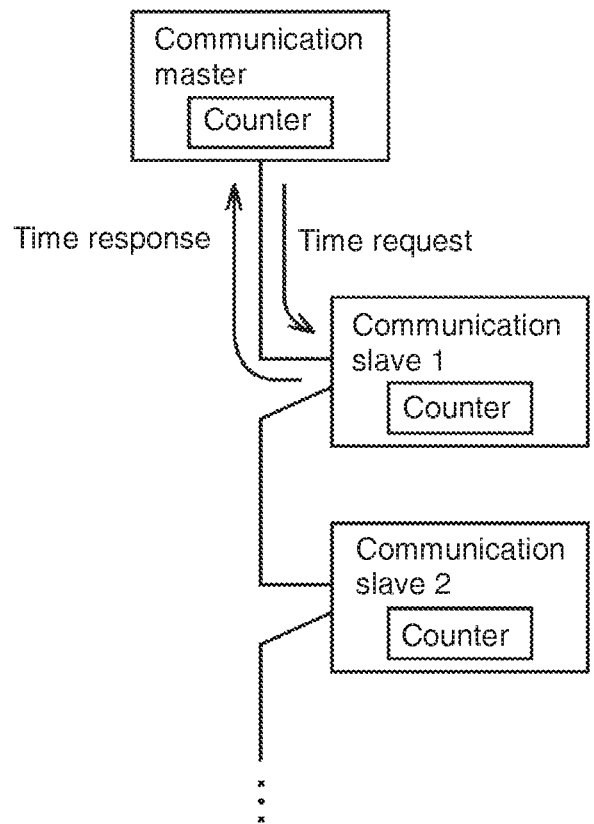
FIGS. 15A to 15C are diagrams illustrating a synchronization management function provided by a communication master in a control system according to one or more embodiments.
Figure 15B:
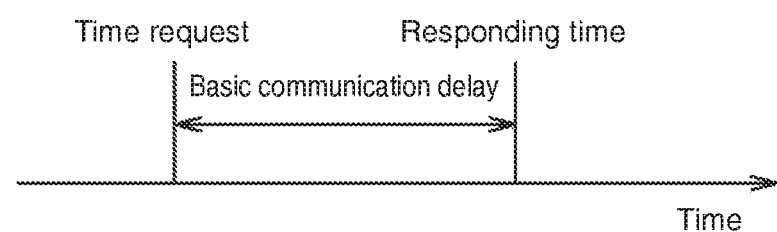
Figure 15C:
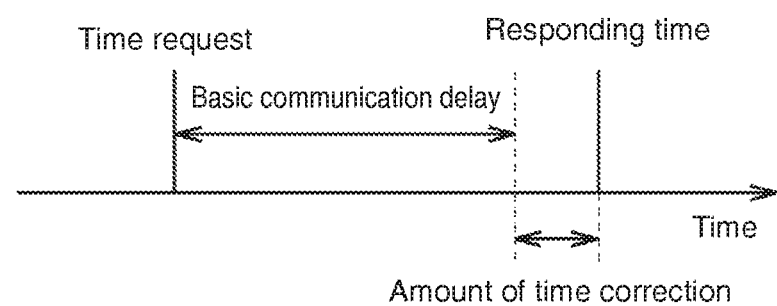

FIGS. 15A to 15C are diagrams describing a synchronization management function provided by a communication master in the control system 1 according to one or more embodiments. For example, as shown in FIG. 15A, a communication master is connected to multiple communication slaves. The communication master and the communication slaves each include a counter.

In this example, the communication master transmits a time request to a communication slave when a predefined condition is satisfied. In response to the time request, this communication slave transmits the counter value of its counter to the communication master (time response).

The time (counter value) transmitted as a response by a communication slave indicates when the communication slave receives a time request. With the complete time synchronization between the communication master and the communication slave, the time at which the communication master transmits a time request and the time at which the communication slave responds to the time request have a delay time between them taken for the time request to propagate and reach the communication slave (corresponding to the basic communication delay d2). The communication slave responds with the counter value obtained when the time request is received. Thus, a propagation delay time in the time response transmitted from the communication slave to communication master may be ignored.

In other words, with the complete time synchronization between the communication master and the communication slave, the difference between when the time request is transmitted and when the communication slave responds will match the basic communication delay d2 as shown in FIG. 15B.

However, with the communication master and the communication slave out of time synchronization, the time gap widens or narrows as shown in FIG. 15C. The communication master determines the gap between when the time request is transmitted and when the communication slave responds, and defines a deviation of the gap from the basic communication delay d2 as the amount of time correction.

As a result, the amount of time correction shown in the FIG. 15C is recorded as the real-time communication delay information 3541 (refer to FIGS. 10 and 11). The real-time communication delay information 3541 is then used to correct the dynamic communication delay d3 (dynamic delay). Thus, the dynamic communication delay d3 (dynamic delay) corresponds to a delay time varying over time that depends on the difference between the counter values indicated by the counters that are time-synchronized with each other.

The above procedure allows measurement of the information used to correct the dynamic communication delay d3 (dynamic delay).

F. Use Modes

Several use modes of time-series data in the delay correction according to one or more embodiments will now be described.

Figure 16:
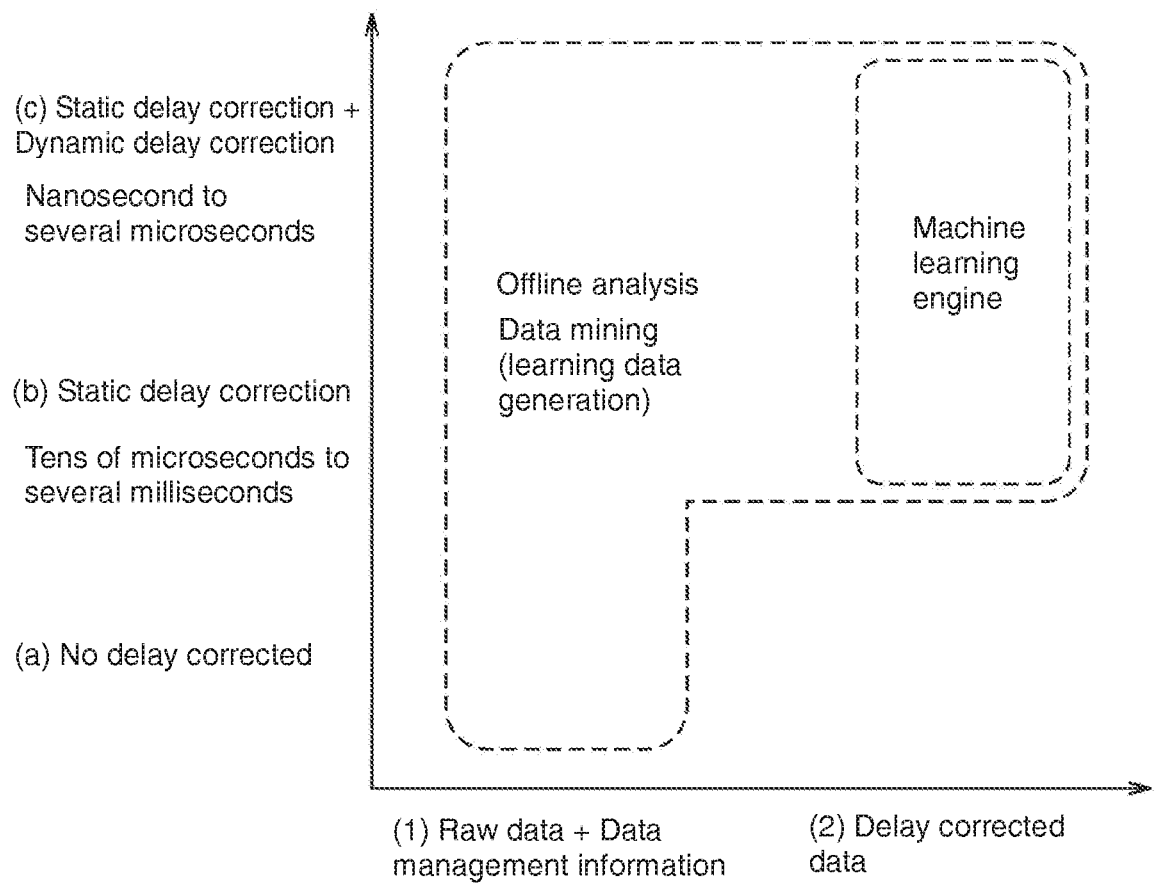
FIG. 16 is a diagram illustrating use modes of time-series data in delay correction according to one or more embodiments.

FIG. 16 is a diagram describing use modes of time-series data in the delay correction according to one or more embodiments. In the chart shown in FIG. 16, the horizontal axis represents the mode of output data, whereas the vertical axis represents the status of the delay correction.

Referring to FIG. 16, the output data may typically be one of (1) observation value time-series data yet to undergo delay correction (or raw data) with the associated data management information, and (2) delay corrected time-series data (or delay corrected data).

The delay correction status may typically be one of (a) a status with no delay corrected, (b) a status with a static delay corrected, and (c) a status with both a static delay and a dynamic delay corrected.

For example, the static delay correction may refer to correcting a delay time in the order of tens of microseconds to several milliseconds, whereas the dynamic delay correction may refer to correcting a delay time in the order of nanoseconds to several microseconds. The delay correction may be determined in accordance with the application of the observation value time-series data.

For example, in an application involving an offline analysis and data mining to create learning data, any one of the correction statuses (a) to (c) may be selected depending on the accuracy to be achieved. When the time-series data is used (a) with no delay corrected, raw data may be output with no correction, instead of delay corrected data.

When the machine learning engine 140 is used to implement a real-time abnormality detecting function, an appropriate delay correction status may be selected depending on the abnormality detecting method determined based on, for example, the data mining results.

For these use modes, observation values may be written into the embedded database 180 in the CPU 100 according to one or more embodiments in the processing modes described below.

(1) Observation values collected from a function unit 150 are associated with times and then stored with no correction.

(2) Observation values collected from a function unit 150 undergo static correction before stored.

(3) Observation values collected from a function unit 150 undergo dynamic correction before stored.

(4) Observation values collected from a function unit 150 undergo static correction and dynamic correction, before stored.

Mode (1) allows faster storage of observation values into the embedded database 180.

The stored observation values may be output from the embedded database 180 in the CPU 100 according to one or more embodiments in the processing modes described below.

(1) The stored observation value time-series data (raw data) is output.

(2) The stored observation value time-series data (raw data) and the associated static delay correcting data 352 are output.

(3) The stored observation value time-series data (raw data) and the associated dynamic delay correcting data 354 are output.

(4) The stored observation value time-series data (raw data) and the associated static delay correcting data 352 and dynamic delay correcting data 354 are output.

(5) The stored delay corrected data is output.

(6) The stored delay corrected data and the associated static delay correcting data 352 are output.

(7) The stored delay corrected data and the associated dynamic delay correcting data 354 are output.

(8) The stored delay corrected data and the associated static delay correcting data 352 and dynamic delay correcting data 354 are output.

These processing modes may not be used, and any data storage mode and data output mode may be used depending on the use mode and the application of observation values. For different types of observation values, a data storage mode and a data output mode may be determined for each observation value. The different observation values may not share the same data storage mode and data output mode.

G. Notes

One or more embodiments described above specifically target input signals (digital signals and/or analog signals) provided from a control target to a function unit 150. However, output signals (digital signals and/or analog signals) may also be processed in the same manner.

H. Advantages

When an observation value is stored in the database function (embedded database) of the CPU, the time assigned to the observation value is typically the time at which the observation value is written into the database. This processing mode can have no problem in subsequent data use unless high time accuracy is to be achieved.

However, achieving higher analysis accuracy by increasing the time accuracy involves accurately determining the time at which an observation value has actually appeared.

In the processing described above, an observation value to be written and managed in the database does not correspond to the time at which the physical phenomenon represented by the observation value actually occurs. The observation value corresponds to a time including various delay times involved in data transmission through the function unit and the coupler unit.

Thus, when the observation value time-series data stored in the database is subsequently used for control or analysis, the time-series data being out of synchronization with the actual physical phenomenon is to be examined each time.

The PLC according to one or more embodiments stores, in a manner associated with the observation values, data management information including the static delay determined based on the configuration information and the setting information predefined in the CPU and/or the dynamic delay, which may vary over time. The time associated with an observation value read from the database is corrected based on the data management information. This correction enables easy identification of the time at which the physical phenomenon represented by the observation value has actually occurred.

With the function of identifying the time at which the physical phenomenon represented by an observation value actually occurs, delay times or other factors can be eliminated in subsequent use of the observation value time-series data stored in the database. This enables control and analysis with high accuracy.

For a controller that stores observation value time-series data (raw data) in the database with no correction together with data management information, a processing load on the controller caused by time correction processing can be prevented from increasing. Thus, a controller with limited processing power can store data into the database with a short sampling period.

The one or more embodiments disclosed herein should be considered to be in all respects illustrative and not restrictive. The scope of the invention is not defined by the one or more embodiments described above but is defined by the appended claims, and all changes that come within the meaning and range of equivalency of the claims are intended to fall within the claims.

REFERENCE SIGNS LIST

1 control system
2 PLC
3, 3A, 3B, 3C, 3D remote IO device
4, 5, 6 fieldbus
8 upper network
12, 14 local bus
100 CPU
102, 202 processor
104 chipset
106, 206 main memory
108, 208 secondary storage
110 network controller
112, 212 USB controller
114 memory card interface
116 memory card
118, 152, 166 local bus controller
119, 121, 126, 151, 153, 161, 167 counter
120, 162 fieldbus controller
128 RTC
130 PLC engine
134 scheduler
136 variable management program
138 control program
140 machine learning engine
142 learning function
144 abnormality detecting function
146 event log
150 function unit
154, 164 main controller
156 functional module
160 coupler unit
180 embedded database
182, 184, 300, 310, 502, 504 time-series data
190 embedded-database management service
192 delay obtaining module
194 time determination module
196 data output module
200 support apparatus
204 display
210 internal bus
214 input device
216 OS
218 support program
260 data mining tool
262 embedded-database access function
264 data mining function
266 visualization function
270 machine learning parameter setting tool
272 variable access function
350 data management information
352 static delay correcting data
354 dynamic delay correcting data 402, 422 input processing
404, 408, 424, 428, 432, 436 transmission processing
406, 426, 434 preprocessing
410, 430, 438 reception processing
412, 440 storing processing
506 static delay corrected data
508 dynamic delay corrected data
1362 system variable
1364 device variable
1366 abnormality detecting parameter
1381 user program
1382 embedded-database reading program
1383 embedded-database writing program
1384 machine learning engine interface
1385 learning request program
1386 monitoring request program
1387 serialization program
1388 feature quantity generation program
3521 basic communication delay information
3522 system configuration information
3523 slave setting information
3541 real-time communication delay information
d1 function-unit-caused delay
d1' dynamic delay
d2 basic communication delay
d3 dynamic communication delay

The invention claimed is:

1. A controller that performs a control operation associated with a control target, the controller comprising:
a communication interface configured to electrically connect at least one function unit to the controller through a data transmission path, wherein:
the controller is configured to perform operations comprising:
operation as a writing unit configured to write an observation value obtained through the function unit into a database; and
operation as a delay obtaining unit configured to obtain a delay time taken from when a signal indicating the observation value is input into the function unit to when data representing the observation value becomes usable in the controller, and store information indicating the obtained delay time;
the delay time comprises a first delay time that does not vary over time and a second delay time that varies over time;
the communication interface comprises a counter and the function unit comprises a counter, and the counters are time-synchronized with each other;
the second delay time comprises a delay time that varies over time depending on a difference between counter values indicated by the counters;
the controller is further configured with the program to perform operations comprising operation as a time determination unit configured to determine a time at which the signal indicating the observation value has appeared based on the information indicating the delay time obtained by the delay obtaining unit; and
the controller is further configured with the program such that:
operation as the writing unit comprises associating the observation value with the time at which the observation value becomes usable in the controller, and writing the observation value and the time into the database; and
operation as the time determination unit comprises correcting the time associated with the observation value read from the database based on the information indicating the delay time obtained by the delay obtaining unit to determine the time at which the signal indicating the observation value has appeared.

2. The controller according to claim 1, wherein
the first delay time includes a delay time that depends on at least one of a processing characteristic defined in the function unit and a function of the function unit.

3. The controller according to claim 1, wherein
the first delay time includes a delay time that depends on the data transmission path from the function unit to the controller.

4. The controller according to claim 1, wherein the controller is configured to perform operations further comprising:
operation as an output unit configured to output the observation value stored in the database and information indicating the delay time associated with the observation value.

5. The controller according to claim 1, wherein
the database is embedded in the controller.

6. A non-transitory computer-readable storage medium storing a control program that is executable by a controller for performing a control operation associated with a control target, the controller being electrically connected to at least one function unit through a data transmission path with a communication interface, the control program causing the controller to perform operations comprising:
writing an observation value obtained through the function unit into a database;
obtaining a delay time taken from when a signal indicating the observation value is input into the function unit to when data representing the observation value becomes usable in the controller, and storing information indicating the obtained delay time; and
determining a time at which the signal indicating the observation value has appeared based on the information indicating the obtained delay time, wherein
the delay time comprises a first delay time that does not vary over time and a second delay time that varies over time,
the communication interface comprises a counter and the function unit comprises a counter, and the counters are time-synchronized with each other,
the second delay time comprises a delay time that varies over time depending on a difference between counter values indicated by the counters,
the writing comprises associating the observation value with the time at which the observation value becomes usable in the controller, and writing the observation value and the time into the database, and
the determining comprises correcting the time associated with the observation value read from the database based on the information indicating the obtained delay time to determine the time at which the signal indicating the observation value has appeared.

7. A control system, comprising:
a controller configured to perform a control operation associated with a control target; and
at least one function unit electrically connected to the controller through a data transmission path with a communication interface of the controller,
wherein:
the controller is configured to perform operations comprising:

operation as a writing unit configured to write an observation value obtained through the function unit into a database; and operation as a delay obtaining unit configured to obtain a delay time taken from when a signal indicating the observation value is input into the function unit to when data representing the observation value becomes usable in the controller, and store information indicating the obtained delay time;

the delay time comprises a first delay time that does not vary over time and a second delay time that varies over time;

the communication interface comprises a counter and the function unit comprises a counter, and the counters are time-synchronized with each other, the second delay time includes a delay time that varies over time depending on a difference between counter values indicated by the counters;

the controller is further configured with the program to perform operations comprising operation as a time determination unit configured to determine a time at which the signal indicating the observation value has appeared based on the information indicating the delay time obtained by the delay obtaining unit; and the controller is further configured with the program such that:
  operation as the writing unit comprises associating the observation value with the time at which the observation value becomes usable in the controller, and writing the observation value and the time into the database; and
  operation as the time determination unit comprises correcting the time associated with the observation value read from the database based on the information indicating the delay time obtained by the delay obtaining unit to determine the time at which the signal indicating the observation value has appeared.

8. The non-transitory computer-readable storage medium according to claim 6, wherein
the first delay time comprises a delay time that depends on at least one of a processing characteristic defined in the function unit and a function of the function unit.

9. The non-transitory computer-readable storage medium according to claim 6, wherein
the first delay time comprises a delay time that depends on the data transmission path from the function unit to the controller.

10. The non-transitory computer-readable storage medium according to claim 6, the operations further comprising
outputting the observation value stored in the database and information indicating the delay time associated with the observation value.

11. The controller system according to claim 7, wherein the controller is configured such that
the first delay time comprises a delay time that depends on at least one of a processing characteristic defined in the function unit and a function of the function unit.

12. The controller system according to claim 7, wherein the controller is configured such that
the first delay time comprises a delay time that depends on the data transmission path from the function unit to the controller.

13. The controller system according to claim 7, wherein the controller is further configured to perform operations comprising
operation as an output unit configured to output the observation value stored in the database and information indicating the delay time associated with the observation value.

14. The controller system according to claim 7, wherein the database is embedded in the controller.

* * * * *